US010573307B2

United States Patent
Skantze et al.

(10) Patent No.: US 10,573,307 B2
(45) Date of Patent: Feb. 25, 2020

(54) VOICE INTERACTION APPARATUS AND VOICE INTERACTION METHOD

(71) Applicants: Gabriel Skantze, Stockholm (SE); Martin Johansson, Stockholm (SE); Tatsuro Hori, Miyoshi (JP); Narimasa Watanabe, Nagakute (JP)

(72) Inventors: Gabriel Skantze, Stockholm (SE); Martin Johansson, Stockholm (SE); Tatsuro Hori, Miyoshi (JP); Narimasa Watanabe, Nagakute (JP)

(73) Assignees: Furhat Robotics AB, Stockholm (SE); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 5 days.

(21) Appl. No.: 15/797,411

(22) Filed: Oct. 30, 2017

(65) Prior Publication Data

US 2018/0122377 A1  May 3, 2018

(30) Foreign Application Priority Data

Oct. 31, 2016 (JP) .................................. 2016-213897

(51) Int. Cl.
*G10L 15/22* (2006.01)
*G10L 15/18* (2013.01)
(Continued)

(52) U.S. Cl.
CPC ............ *G10L 15/22* (2013.01); *G06F 17/271* (2013.01); *G10L 13/00* (2013.01);
(Continued)

(58) Field of Classification Search
CPC . G10L 15/22; G10L 15/1807; G10L 15/1815; G10L 15/1822
See application file for complete search history.

(56) References Cited

U.S. PATENT DOCUMENTS

| 8,103,505 B1* | 1/2012 | Silverman | ............. G10L 13/033 |
| | | | 704/258 |
| 2001/0021909 A1* | 9/2001 | Shimomura | ............. G10L 15/22 |
| | | | 704/275 |

(Continued)

FOREIGN PATENT DOCUMENTS

| JP | 8-123474 A | 5/1996 |
| JP | 2001-188784 A | 7/2001 |
| JP | 2015-225134 A | 12/2015 |

OTHER PUBLICATIONS

Zellers, M., & Post, B. (2009). Fundamental frequency and other prosodic cues to topic structure. Proceedings of IDP, 2009.*

(Continued)

*Primary Examiner* — Bryan S Blankenagel
(74) *Attorney, Agent, or Firm* — Sughrue Mion, PLLC

(57) ABSTRACT

A syntactic analysis unit 104 performs a syntactic analysis for linguistic information on acquired user' speech (hereinafter simply referred to as "user speech"). A non-linguistic information analysis unit 106 analyzes non-linguistic information different from the linguistic information for the acquired user speech. A topic continuation determination unit 110 determines whether a topic of the current conversation should be continued or should be changed to a different topic according to the non-linguistic information analysis result. A response generation unit 120 generates a response according to a result of a determination by the topic continuation determination unit 110.

10 Claims, 16 Drawing Sheets

(51) Int. Cl.
  *G06F 17/27* (2006.01)
  *G10L 13/00* (2006.01)
(52) U.S. Cl.
  CPC ...... *G10L 15/1807* (2013.01); *G10L 15/1815* (2013.01); *G10L 15/1822* (2013.01); *G10L 2015/223* (2013.01)

(56) References Cited

U.S. PATENT DOCUMENTS

| | | | | |
|---|---|---|---|---|
| 2006/0122834 | A1* | 6/2006 | Bennett | G10L 15/1822 704/256 |
| 2006/0179022 | A1* | 8/2006 | Holland | G06N 3/004 706/45 |
| 2008/0066136 | A1* | 3/2008 | Dorai | H04N 5/147 725/135 |
| 2012/0224021 | A1* | 9/2012 | Begeja | H04N 7/147 348/14.08 |
| 2016/0379643 | A1* | 12/2016 | Ito | G10L 15/1822 704/270.1 |
| 2017/0060839 | A1* | 3/2017 | Kawamura | G10L 25/63 |
| 2017/0160813 | A1* | 6/2017 | Divakaran | G06F 3/017 |

OTHER PUBLICATIONS

Katsuji Bessho et al., "Estimation of users' desire to continue conversation on current topics in chat-oriented digalougue systems", materials of 74th Special Interest Group on Spoken Language Understanding and Dialogue Processing, Jul. 22, 2015, p. 1-6 (9 pages total).

Kenji Imamura et al., "Predicate-Argument Structure Analysis and Zero-Anaphora Resolution for Dialogue Analysis", Natural Language Processing, Mar. 16, 2015, vol. 22, No. 1, pp. 3-26 (26 pages total).

Office Action dated Dec. 3, 2019 in Japanese Application No. 2016-213897.

* cited by examiner

FEATURE VECTOR $V_i = (V_{i1}, V_{i2}, V_{i3}, V_{i4}, V_{i5}, \cdots, V_{im}, V_{i(m+1)}, V_{i(m+2)}, \cdots)$
$= (f0_T, V_T, f0, V, L1, \cdots, D1, 1, 1, \cdots)$

| INFORMATION TYPE | ELEMENT | | COMPONENT VALUE | COMPONENT |
|---|---|---|---|---|
| i-th USER SPEECH INFORMATION | PHRASE END Tmsec | f0 | $f0_T$ | $V_{i1}$ |
| | | VOLUME | $V_T$ | $V_{i2}$ |
| | WHOLE SPEECH SECTION | f0 | f0 | $V_{i3}$ |
| | | VOLUME | V | $V_{i4}$ |
| | USER SPEECH LENGTH | | L1 | $V_{i5}$ |
| | . . . . | | . . . | . . . |
| HISTORY OF APPARATUS RESPONSES | DURATION OF SAME TOPIC | | D1 | $V_{im}$ |
| | TYPE OF IMMEDIATELY-PRECEDING RESPONSE | | 1 | $V_{i(m+1)}$ |
| | TYPE OF NEWEST QUESTION | | 1 | $V_{i(m+2)}$ |
| | . . . . | | . . . | . . . |

TYPE OF IMMEDIATELY-PRECEDING RESPONSE:
0: SHORT RESPONSE, 1: ATTENTIVELY-LISTENING RESPONSE, 2: QUESTION, 3: ANSWER

TYPE OF NEWEST QUESTION :
0: PROBING QUESTION, 1, TRANSITION QUESTION

Fig. 3

| No | SPEAKER | CONTENT OF SPEECH | |
|---|---|---|---|
| 1 | APPARATUS | HAVE YOU TAKEN A WALK RECENTLY? | |
| 2 | USER | WELL, RECENTLY, | |
| 3 | APPARATUS | YAH. | |
| 4 | USER | BECAUSE IT RAINS A LOT, | |
| 5 | APPARATUS | UH-HUH. | |
| 6 | USER | ONCE IN A MONTH OR SO. | |
| 7 | APPARATUS | HOW IS YOUR REHABILITATION GOING? | TRANSITION DECISION |
| 8 | USER | NOT BAD. | |
| 9 | APPARATUS | COULD YOU TELL ME MORE ABOUT IT? | CONTINUATION DECISION |
| 10 | USER | FROM YESTERDAY. | |
| 11 | APPARATUS | YAH. | |

Fig. 5

| No | SPEAKER | CONTENT OF SPEECH | |
|---|---|---|---|
| 1 | APPARATUS | HAVE YOU TAKEN A WALK RECENTLY? | |
| 2 | USER | WELL, RECENTLY, | |
| 3 | APPARATUS | YAH. | |
| 4 | USER | BECAUSE IT RAINS A LOT, | |
| 5 | APPARATUS | UH-HUH. | |
| 6 | USER | ONCE IN A MONTH OR SO. | |
| 7 | APPARATUS | I SEE. | |
| 8 | USER | RECENTLY, I HAVE NOT BEEN ABLE TO TAKE A WALK MUCH. | |
| 9 | APPARATUS | YES. | |
| 10 | USER | BECAUSE I WAS IN THE HOSPITAL FOR A LONG TIME. | |
| 11 | APPARATUS | HOW IS YOUR REHABILITATION GOING? | ←TRANSITION |
| 12 | USER | NOT BAD. | |

Fig. 6

FEATURE VECTOR
$v_i = (x_1, x_2, \cdots, x_{17})$

| INFORMATION TYPE | FEATURE | DIMENSION (COMPONENT) |
|---|---|---|
| i-th USER SPEECH INFORMATION | AVERAGE OF f0 IN 200 msec AT PHRASE END | $x_1$ |
| | STANDARD DEVIATION OF f0 IN 200 msec AT PHRASE END | $x_2$ |
| | MAXIMUM VALUE OF f0 IN 200 msec AT PHRASE END | $x_3$ |
| | INCLINATION OF f0 IN 200 msec AT PHRASE END | $x_4$ |
| | AVERAGE OF f0 IN 500 msec AT PHRASE END | $x_5$ |
| | USER SPEECH LENGTH | $x_6$ |
| | · · · · | · · · · |
| HISTORY OF APPARATUS RESPONSES | · · · · | · · · · |
| | DURATION OF SAME TOPIC | $x_{15}$ |
| | TYPE OF IMMEDIATELY-PRECEDING RESPONSE | $x_{16}$ |
| | TYPE OF NEWEST QUESTION | $x_{17}$ |

Fig. 13

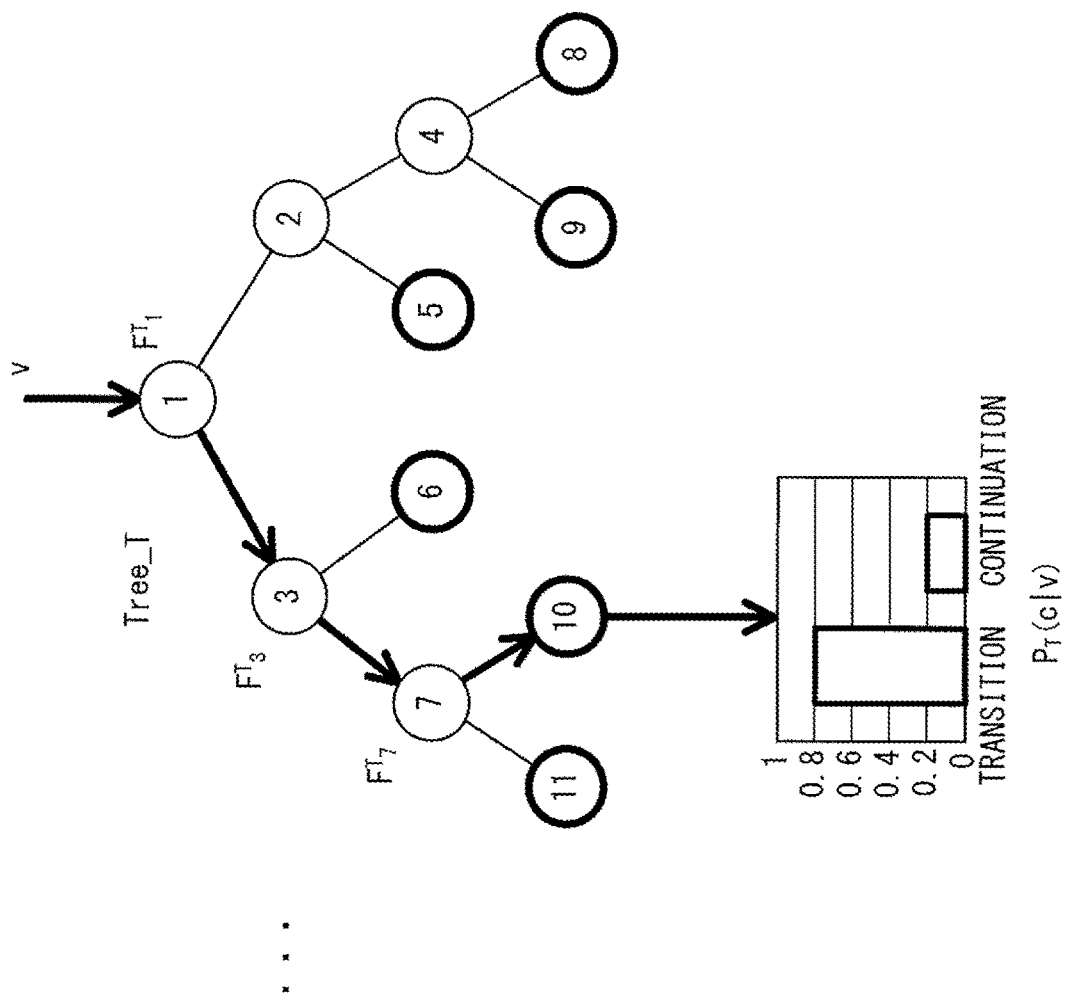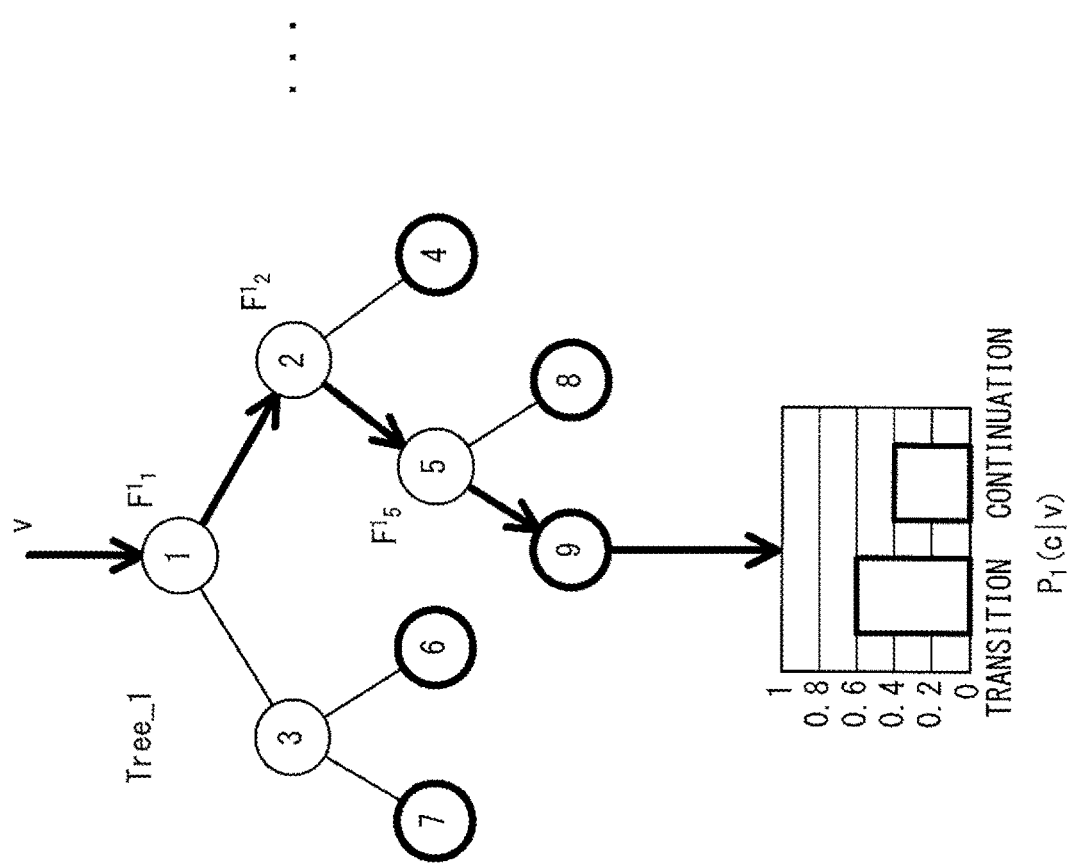
Fig. 17

VOICE INTERACTION APPARATUS AND VOICE INTERACTION METHOD

CROSS REFERENCE TO RELATED APPLICATIONS

This application is based upon and claims the benefit of priority from Japanese patent application No. 2016-213897, filed on Oct. 31, 2016, the disclosure of which is incorporated herein in its entirety by reference.

BACKGROUND

The present disclosure relates to a voice interaction apparatus and a voice interaction method, and in particular to a voice interaction apparatus and a voice interaction method for having a conversation with a user by using a voice.

A technique for enabling a user to enjoy a daily conversation with a voice interaction robot (a voice interaction apparatus) is becoming widespread. A voice interaction robot according to this technique recognizes a voice uttered by a user and produces (outputs) a reply to the recognized voice. Such a voice interaction robot may also determine whether or not to continue the topic of the current conversation.

Regarding the above-described technique, Japanese Unexamined Patent Application Publication No. 2015-225134 discloses a topic conversion detection apparatus. The topic conversion detection apparatus disclosed in Japanese Unexamined Patent Application Publication No. 2015-225134 detects a position that may be a boundary between topics in a series of speeches in real time.

SUMMARY

In the technique disclosed in Japanese Unexamined Patent Application Publication No. 2015-225134, it is impossible to determine whether a topic should be continued (i.e., maintained) or changed unless the content of user's speech (hereinafter simply referred to as "user speech") is analyzed through a syntactic analysis or the like. It should be noted that the syntactic analysis involves processing that requires a long time such as pattern recognition. Further, in the method in which it is determined whether a topic should be continued by performing a syntactic analysis, when a user wants to change the topic, the user needs to put a word(s) that prompts the apparatus to change the topic in his/her speech. Otherwise, the user cannot change the topic. Therefore, in the technique disclosed in Japanese Unexamined Patent Application Publication No. 2015-225134, there is a possibility that the topic cannot be changed at an appropriate timing.

The present disclosure provides a voice interaction apparatus and a voice interaction method capable of changing a topic at an appropriate timing.

A first exemplary aspect is a voice interaction apparatus configured to have a conversation with a user by using a voice, including: a speech acquisition unit configured to acquire user speech, the user speech being speech given by the user; a syntactic analysis unit configured to perform a syntactic analysis for linguistic information on the acquired user speech; a response generation unit configured to generate a response according to the user speech; a voice output unit configured to output a voice corresponding to the generated response for the user; a non-linguistic information analysis unit configured to analyze non-linguistic information for the acquired user speech, the non-linguistic information being different from the linguistic information and including at least one of prosodic information on the user speech and history information about a response generated by the response generation unit; and a topic continuation determination unit configured to determine whether or not a topic of a current conversation should be continued according to a non-linguistic information analysis result, the non-linguistic information analysis result being a result of an analysis by the non-linguistic information analysis unit, in which the response generation unit generates a response according to a result of a determination by the topic continuation determination unit.

Further, another exemplary aspect is a voice interaction method performed by using a voice interaction apparatus configured to have a conversation with a user by using a voice, including: acquiring user speech, the user speech being speech given by the user; performing a syntactic analysis for linguistic information on the acquired user speech; analyzing non-linguistic information for the acquired user speech, the non-linguistic information being different from the linguistic information and including at least one of prosodic information on the user speech and history information about a response generated by the voice interaction apparatus; determining whether or not a topic of a current conversation should be continued according to a non-linguistic information analysis result, the non-linguistic information analysis result being an analysis result of the non-linguistic information; and outputting a voice corresponding to a response generated according to a result of the determination.

By the above-described configuration, the present disclosure can determine whether or not a topic should be continued without using a result of a syntactic analysis. Therefore, the present disclosure enables a topic to be changed at an appropriate timing.

Further, the topic continuation determination unit preferably determines whether or not the topic should be continued based on a comparison between at least one feature quantity included in the non-linguistic information analysis result and a predetermined threshold corresponding to the feature quantity.

By the above-described configuration, the present disclosure can easily determine whether or not the topic should be continued.

Further, the topic continuation determination unit preferably determines that the topic should be changed when a duration of the same topic (i.e., a duration of one topic) is equal to or longer than a predetermined threshold.

By the above-described configuration, the present disclosure can reliably change the topic when the same topic continues for a long time.

Further, the topic continuation determination unit preferably determines whether or not the topic should be continued by determining whether a feature indicated by the non-linguistic information analysis result corresponds to continuation of the topic or corresponds to a change of the topic by using a determination model generated in advance through machine learning.

By the above-described configuration, the present disclosure can determine whether or not the topic should be continued more accurately.

According to the present disclosure, it is possible to provide a voice interaction apparatus and a voice interaction method capable of changing a topic at an appropriate timing.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF DRAWINGS

FIG. 3 shows an example of a feature vector generated by a non-linguistic information analysis unit according to the first embodiment;

FIG. 5 shows an example of a conversation held between the voice interaction apparatus according to the first embodiment and a user;

FIG. 6 shows an example of a conversation held between a voice interaction apparatus according to a related art and a user;

FIG. 13 shows an example of a feature vector assigned to a sample;

FIG. 17 is a diagram for explaining a method for classifying feature vectors by using the decision trees (the determination model) shown in FIG. 14.

DESCRIPTION OF EMBODIMENTS

First Embodiment

Embodiments according to the present disclosure are hereinafter explained with reference to the drawings. Note that the same symbols are assigned to the same components throughout the drawings and duplicated explanations are omitted as required.

Figure 1:
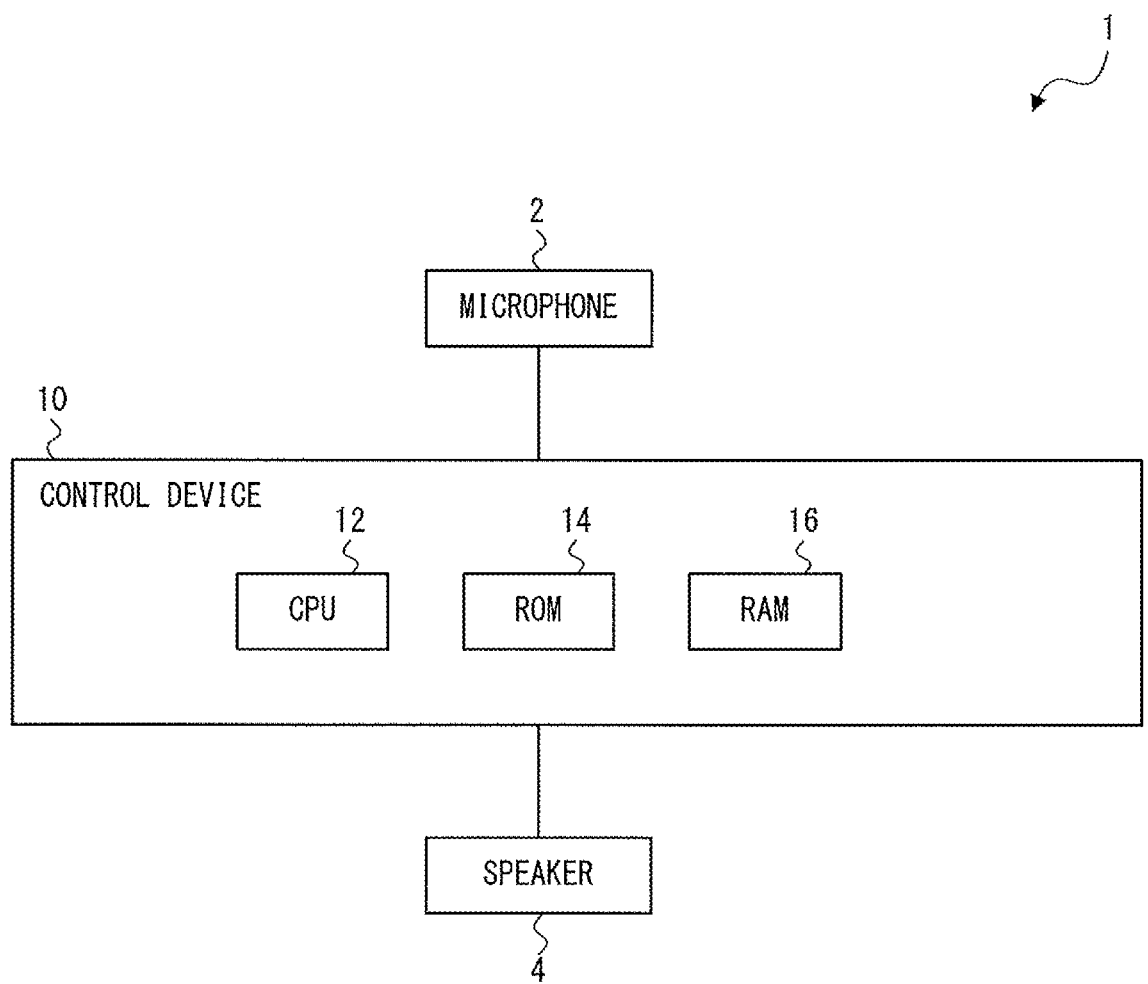
FIG. 1 shows a hardware configuration of a voice interaction apparatus according to a first embodiment.

FIG. 1 shows a hardware configuration of a voice interaction apparatus 1 according to a first embodiment. The voice interaction apparatus 1 performs a conversation with a user by using a voice. Specifically, the voice interaction apparatus 1 performs a conversation with a user by outputting a voice for the user according to speech given by the user (i.e., according to user speech). The voice interaction apparatus 1 can be installed in, for example, a robot such as a livelihood support robot and a compact robot, a cloud system, a smart phone, and so on.

The voice interaction apparatus 1 includes a microphone 2 that collects surrounding sounds, a speaker 4 that produces a voice, and a control device 10. Note that the voice interaction apparatus 1 may include an image pickup device such as a camera. The control device 10 has, for example, a function as a computer. The control device 10 is connected to the microphone 2 and the speaker 4 wirelessly or through a wire.

The control device 10 includes, as main hardware components, a CPU (Central Processing Unit) 12, a ROM (Read Only Memory) 14, and a RAM (Random Access Memory) 16. The CPU 12 has a function as an arithmetic unit that performs a control process, an arithmetic process, and the like. The ROM 14 has a function of storing a control program, an arithmetic program, and the like executed by the CPU 12. The RAM 16 has a function of temporarily storing processing data and the like.

The control device 10 analyzes user speech collected by the microphone 2 and generates a response for the user according to the user speech. Then, the control device 10 outputs a voice (a response voice) corresponding to the generated response through the speaker 4.

Figure 2:
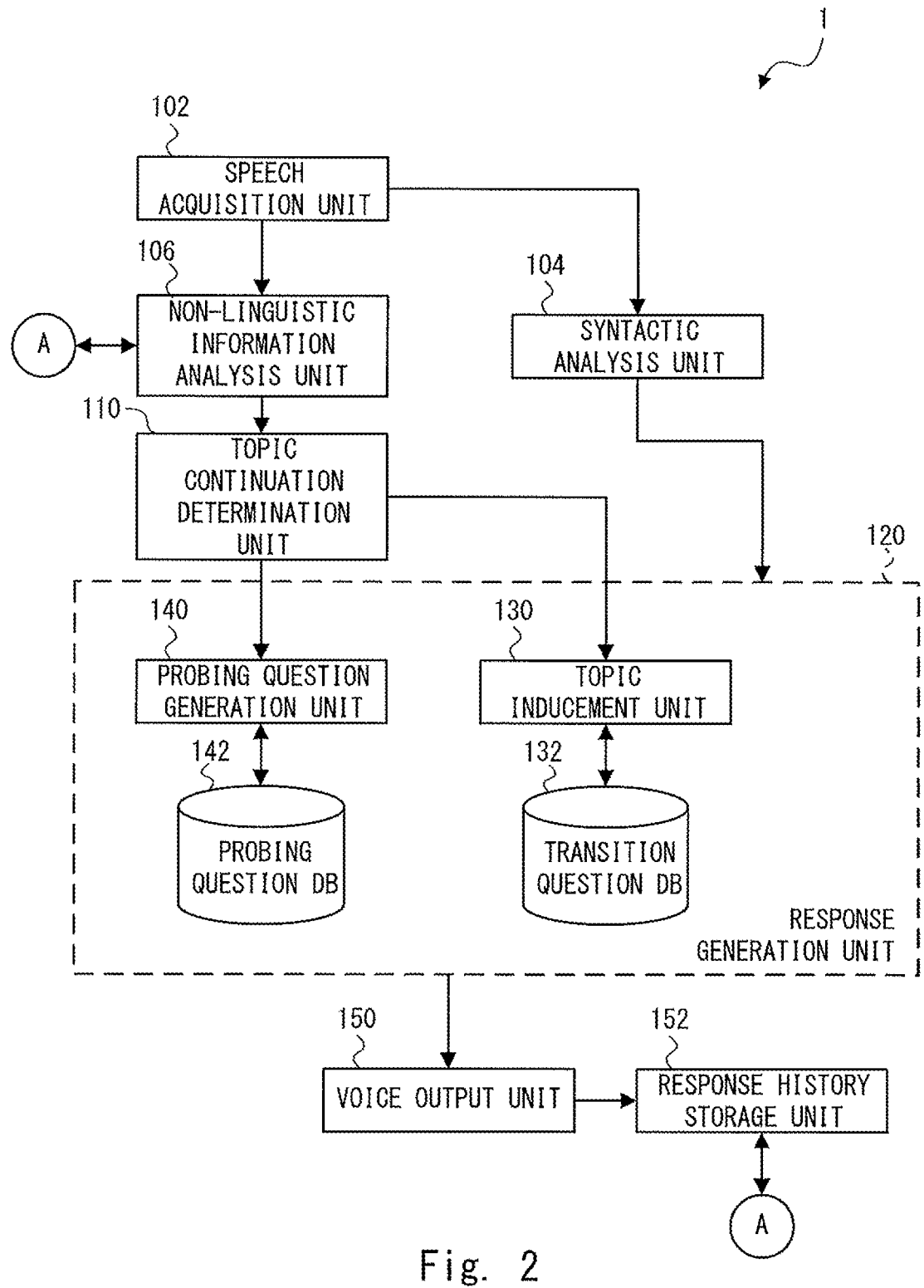
FIG. 2 is a block diagram showing a configuration of the voice interaction apparatus according to the first embodiment.

FIG. 2 is a block diagram showing a configuration of the voice interaction apparatus 1 according to the first embodiment. The voice interaction apparatus 1 includes a speech acquisition unit 102, a syntactic analysis unit 104, a non-linguistic information analysis unit 106, a topic continuation determination unit 110, a response generation unit 120, a voice output unit 150, and a response history storage unit 152. Further, the response generation unit 120 includes a topic inducement unit 130, a transition question database 132 (a transition question DB; Database), a probing question generation unit 140, and a probing question database 142 (a proving question DB).

Each of the components shown in FIG. 2 can be implemented by at least one of the microphone 2, the speaker 4, and the control device 10. Further, at least one of the components can be implemented, for example, by having the CPU 12 execute a program stored in the ROM 14. Further, a necessary program may be stored in an arbitrary nonvolatile recording medium and may be installed as required. Note that the implementation of each component is not limited to software implementation. That is, each component may be implemented by hardware such as some kind of a circuit element.

The speech acquisition unit 102 may include the microphone 2. The speech acquisition unit 102 acquires user speech. Specifically, the speech acquisition unit 102 collects user speech and converts it into a digital signal. Then, the speech acquisition unit 102 outputs voice data of the user speech (speech voice data) to the syntactic analysis unit 104 and the non-linguistic information analysis unit 106.

The syntactic analysis unit 104 performs a syntactic analysis for linguistic information on the user speech. Further, the syntactic analysis unit 104 generates a syntactic analysis result, i.e., a result of the syntactic analysis. Then, the syntactic analysis unit 104 outputs the syntactic analysis result to the response generation unit 120. Note that the linguistic information means information indicating a character string constituting the user speech.

Specifically, the syntactic analysis unit 104 performs natural language processing for speech voice data indicating user speech by using pattern recognition or the like. More specifically, the syntactic analysis unit 104 performs a syntactic analysis including a voice recognition process and a morphological analysis or the like for the speech voice data. In this way, the syntactic analysis unit 104 can recognize the linguistic content of the user speech. For example, when user speech is "Have you ever been to Kyoto?", the syntactic analysis unit 104 recognizes a character string "Have you ever been to Kyoto?" and may recognize the content of the user speech which means that the user is asking whether or not "you" (i.e., a robot or the like in which the voice interaction apparatus 1 is installed) have ever visited a place called "Kyoto".

The non-linguistic information analysis unit 106 analyzes non-linguistic information that is different from the linguistic information for the user speech. Further, the non-linguistic information analysis unit 106 generates a feature vector (which will be described later) as a result of a non-linguistic information analysis, i.e., a result of an analysis of the non-linguistic information. Then, the non-linguistic information analysis unit 106 outputs the non-linguistic information analysis result (i.e., the feature vector) to the topic continuation determination unit 110.

Note that the non-linguistic information is information that is different from the linguistic information (the character string) of user speech to be processed and includes at least one of prosodic information (or rhythm information) on the user speech and response history information. The prosodic information is information indicating features of a voice waveform of user speech such as a fundamental frequency, a sound pressure, a variation in frequency or the like, a band of variations, a maximum amplitude, an average amplitude, and so on. Further, the response history information is information indicating a past history of responses (response voice data) generated by the response generation unit 120 and output by the voice output unit 150. The response history storage unit 152 stores (updates) this response history information when a response (response voice data) is output by the voice output unit 150.

Specifically, the non-linguistic information analysis unit 106 analyzes prosodic information based on the voice waveform by performing a voice analysis or the like for the speech voice data acquired by the speech acquisition unit 102. Then, the non-linguistic information analysis unit 106 calculates a value indicating a feature quantity indicating the prosodic information. Note that the non-linguistic information analysis unit 106 may calculate, for the speech voice data, a fundamental frequency or the like for each of frames that are obtained by dividing the speech voice data, for example, at the interval of 32 msec. Further, the non-linguistic information analysis unit 106 extracts (or reads) response history information from the response history storage unit 152 and calculates a feature quantity indicating a feature of the response history.

Note that as described above, since the syntactic analysis uses pattern recognition or the like, it often requires a very long time to do this analysis. In contrast to this, the amount of data used for the analysis of the non-linguistic information (i.e., the analysis of the prosodic information and the analysis of the response history information) is smaller than that for the syntactic analysis and its calculation technique is simpler than that for the syntactic analysis. Therefore, the time required for the analysis of the non-linguistic information may be much shorter than the time required for the syntactic analysis.

The topic continuation determination unit 110 determines whether the topic of the current conversation should be continued (i.e., maintained) or be changed to a different topic according to the non-linguistic information analysis result. The topic continuation determination unit 110 outputs a result of this determination to the response generation unit 120. Specifically, when the topic continuation determination unit 110 determines that the topic should be changed to a different topic, it outputs a topic change instruction indicating that the topic should be changed to the topic inducement unit 130. On the other hand, when the topic continuation determination unit 110 determines that the topic should be continued (i.e., maintained), it outputs a topic continuation instruction indicating that the topic should be continued to the probing question generation unit 140.

Note that a specific example of the determination method that the topic continuation determination unit 110 performs by using the non-linguistic information analysis result is explained in later-described other embodiments. For example, the determination method performed by the topic continuation determination unit 110 may be performed by using a predefined determination formula or using a determination model that is generated in advance through machine learning.

The response generation unit 120 generates voice data indicating a voice that is output for the user by using the syntactic analysis result or the non-linguistic information analysis result. Specifically, the response generation unit 120 may generate response voice data indicating a response for the user from the syntactic analysis result. Further, the response generation unit 120 may generate a different response according to the result of the determination made by the topic continuation determination unit 110.

Note that the response is a voice that is produced according to user speech and includes, for example, a "short response" (i.e., a response consisting of one word or a few words such as "uh-huh", hereinafter simply referred to as a "short response"), an "attentively-listening response", a "question", and an "answer". The response generation unit 120 determines which type of response should be used according to, for example, a predetermined setting condition and determines specific voice data corresponding to the determined response type.

The "short response" is a voice indicating that the voice interaction apparatus is listening to user's talk and includes, for example, a voice that is unrelated to the content of the user speech such as "Yah", "Yes", "Uh-huh", and "Yeah". The "attentively-listening response" is a voice indicating that the voice interaction apparatus is listening to user's talk and may be a voice that is determined according to the content of the user speech. The attentively-listening response includes, for example, parroting (i.e., repeating user's words) for the user speech. Further, for example, if the user speech is "I will take you to Kyoto in the near future", the attentively-listening response may be "It's delightful". Further, the "question" is a voice for asking the user some question. The question includes a "probing question" and a "transition question". The "probing question" is a voice indicating a question for asking the user further details about the user speech. For example, the "probing question" may be "Would you explain it in a more detailed manner?". Further, the "transition question" is a voice indicating a question for guiding the user to the next topic (or inducing the user to move to the next topic) so that the topic of the current conversation is changed. As described later, when the topic continuation determination unit 110 determines that the topic of the current conversation should be continued, the response generation unit 120 generates a "probing question". On the other hand, when the topic continuation determination unit 110 determines that the topic of the current conversation should be changed to a different topic, the response generation unit 120 generates a "transition question". Further, the "answer" is a voice that is used when user speech is a question put to the voice interaction apparatus 1 (i.e., a robot or the like in which the voice interaction apparatus 1 is installed), and indicates an answer to that question.

Note that in this embodiment, it is assumed that the entity that provides a topic in a conversation between a user and the voice interaction apparatus 1 is the voice interaction apparatus 1. In this case, the voice interaction apparatus 1 may provide a topic by using a "transition question" response. Note that the "transition question" is a voice that is unrelated to the immediately-preceding user speech. Therefore, the "transition question" may be generated without analyzing the content of the user speech by performing a syntactic analysis. Further, the "probing question" may also be a voice that is unrelated to the immediately-preceding user speech. Therefore, the "probing question" may also be generated without analyzing the content of the user speech by performing a syntactic analysis.

The voice output unit 150 may include the speaker 4. The voice output unit 150 converts response voice data received from the response generation unit 120 into an analog signal. Then, the voice output unit 150 outputs a voice (a response) corresponding to the response voice data from the speaker 4. Further, the voice output unit 150 outputs the same response voice data as that output from the speaker 4 to the response history storage unit 152.

The response history storage unit 152 stores data for identifying this response voice data as response history information. Further, when the response history information includes information about a time related to a conversation, the response history storage unit 152 may measure that time and store the measured time as response history information.

FIG. 3 shows an example of a feature vector generated by the non-linguistic information analysis unit 106 according to the first embodiment. Note that the feature vector shown in FIG. 3 is merely an example. That is, other various feature vectors (e.g., a later-described feature vector shown in FIG. 13) can be used as the feature vector. Letting $v_i$ represent a feature vector for i-th user speech, n components of the feature vector is expressed as "$v_i = (v_{i1}, v_{i2}, \ldots, v_{i(m-1)}, v_{im}, v_{i(m+1)}, \ldots, v_{in})$". Note that each of i, n and m is an integer (n>m). Further, $v_{i1}$ to $v_{i(m-1)}$ correspond to a result of an analysis of prosodic information related to information on the i-th user speech. Further, $v_{im}$ to $v_{in}$ correspond to a result of an analysis of response history information. Note that $v_{im}$ to $v_{in}$ may be information itself stored in the response history storage unit 152. That is, for the response history information, the non-linguistic information analysis unit 106 may just extract (or read) response history from the response history storage unit 152 and may not perform any special analysis.

In the example shown in FIG. 3, $v_{i1}$ represents a parameter for a fundamental frequency f0 ($f0_T$) in T msec at the end of a phrase (hereinafter referred to as the "phrase end") of the i-th user speech (a period between T msec (T milliseconds) before the end of the user speech and the end of the user speech). Further, $v_{i5}$ represents a length L1 [sec] of the i-th user speech (a user speech length). Note that the fundamental frequency f0 may be calculated for each frame by using logic of SWIPE (Saw-tooth Waveform Inspired Pitch Estimation) of SPTK (Speech Signal Processing Toolkit).

Further, $v_{im}$ represents a duration D1 [sec] of the same topic (i.e., a duration of one topic) (a topic duration). The topic duration D1 is a time elapsed from when a "transition question" (a response) is output from the voice output unit 150 the last time. Further, $v_{i(m+1)}$ represents a type of an immediately-preceding response. The type of the immediately-preceding response is a type of an immediately-preceding response output from the voice output unit 150 (i.e., a response output just before the i-th user speech) (and is one of a "short response", an "attentively-listening response", a "question", and an "answer"). Further, $v_{i(m+2)}$ represents a type of a newest question. The type of the newest question is a type of a "question" (a response) output from the voice output unit 150 the last time (and is one of a "probing question" and a "transition question").

Note that for each of component values (feature quantities) of components that are not numerical values such as $v_{i(m+1)}$ and $v_{i(m+2)}$, a numerical value is assigned for each type. For example, for $v_{i(m+1)}$, a component value "0" indicates a "short response" and a component value "1" indicates an "attentively-listening response". Further, a component value "2" indicates a "question" and component value "3" indicates an "answer". Further, for $v_{i(m+2)}$, a component value "0" indicates a "probing question" and a component value "1" indicates a "transition question".

Next, a configuration of the response generation unit 120 (FIG. 2) is explained. Note that the components of the response generation unit 120 shown in FIG. 2 are for a case where a "question", i.e., a question for continuing a topic (i.e., a probing question) or a question for changing a topic (i.e., a transition question) is generated as a response. However, the response generation unit 120 may generate a response other than the "question". In such a case, as described above, the response generation unit 120 may generate response voice data from the syntactic analysis result.

When the topic inducement unit 130 receives a topic change instruction from the topic continuation determination unit 110, it generates a transition question as a response. Specifically, the topic inducement unit 130 generates response voice data indicating a transition question by using the transition question database 132. The transition question database 132 stores a plurality of response voice data indicating transition questions in advance. The topic inducement unit 130 selects a question for a response (response voice data) from the plurality of transition questions stored in the transition question database 132 in an orderly manner or in a random manner. Then, the topic inducement unit 130 outputs the selected response voice data to the voice output unit 150. As a result, a voice indicating a transition question is output by the voice output unit 150. Note that the topic inducement unit 130 may generate a "transition question" response without using the syntactic analysis result. Therefore, the transition question response may be unrelated to the content of the acquired user speech. For example, the topic inducement unit 130 generates a "transition question" response that is unrelated to the user speech but prompts the user to provide the next topic such as "How is your rehabilitation going?". When the topic continuation determination unit 110 determines that the topic should be changed, the topic inducement unit 130 generates a transition question as described above. Therefore, it is possible to change a topic at an appropriate timing without giving the user a feeling of wrongness. That is, it is possible to prevent a topic that a user is not interested in from being continued (i.e., maintained) and thereby prevent the user from being given an unpleasant feeling. Therefore, it is possible to improve the level of satisfaction in the conversation with the voice interaction apparatus 1.

When the probing question generation unit 140 receives a topic continuation instruction from the topic continuation determination unit 110, it generates a probing question as a response. Specifically, the probing question generation unit 140 generates response voice data indicating a probing question by using the probing question database 142. The probing question database 142 stores a plurality of response voice data indicating probing questions in advance. The probing question generation unit 140 selects a question for a response from the plurality of probing questions stored in the probing question database 142 in an orderly manner or in a random manner. Then, the probing question generation unit 140 outputs the selected response voice data to the voice output unit 150. As a result, a voice indicating a probing question is output by the voice output unit 150. Note that the probing question generation unit 140 may generate a "probing question" response without using the syntactic analysis result. Therefore, the probing question response may be unrelated to the content of the acquired user speech. For example, the probing question generation unit 140 generates a "probing question" response that is unrelated to the user speech but prompts the user to continue (i.e., maintain) the topic such as "Would you explain it in a more detailed manner?". As described above, when the topic continuation determination unit 110 determines that the topic should be continued, the topic inducement unit 130 generates a probing question as described above. Therefore, it is possible to continue the topic without giving the user a feeling of wrongness. That is, it is possible to prevent the topic that the user wants to continue from being changed to a different topic and thereby prevent the conversation from remaining superficial from beginning to end. Therefore, it is possible to improve the level of satisfaction in the conversation with the voice interaction apparatus 1.

Figure 4:
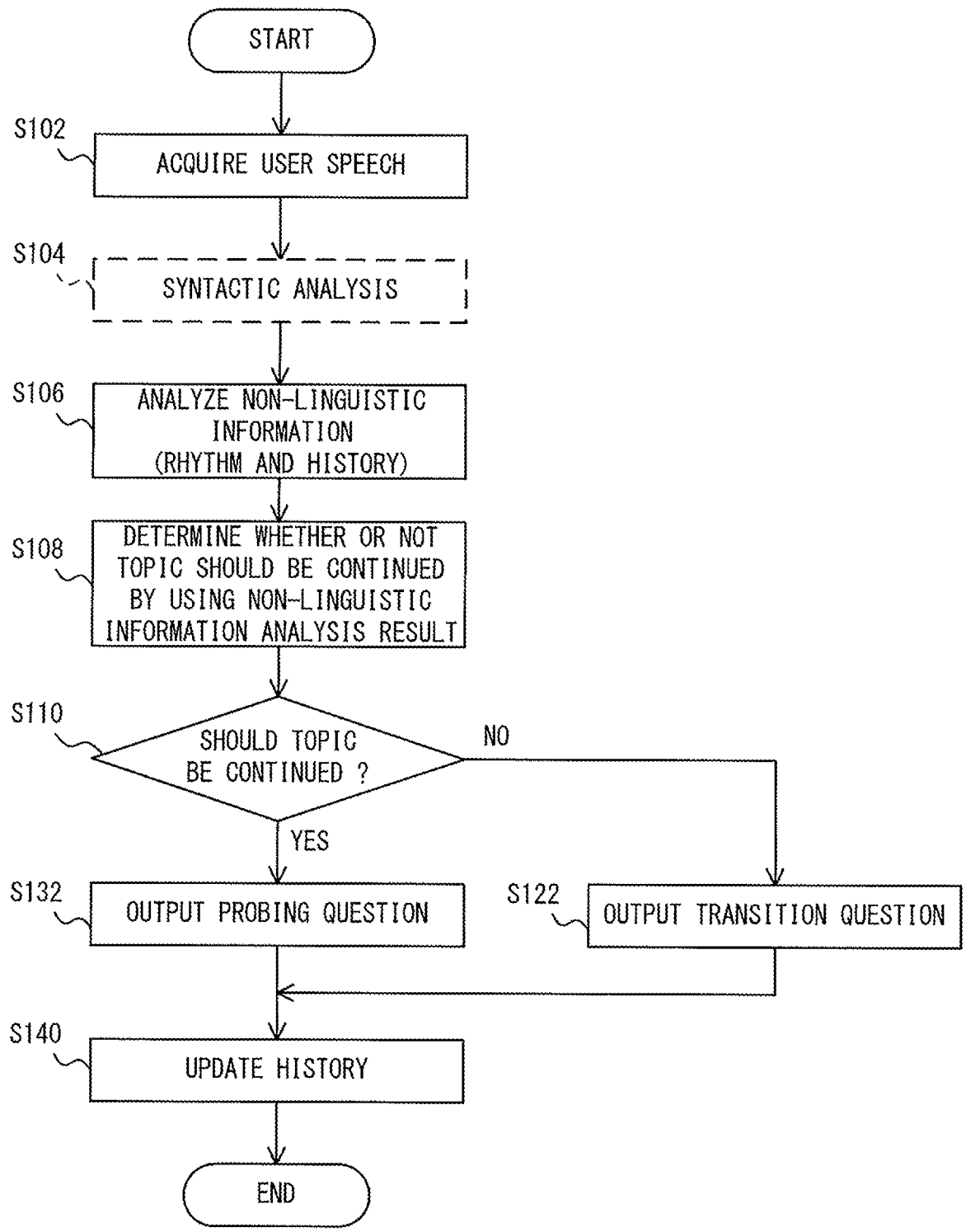
FIG. 4 is a flowchart showing a voice interaction method performed by the voice interaction apparatus according to the first embodiment.

FIG. 4 is a flowchart showing a voice interaction method performed by the voice interaction apparatus 1 according to the first embodiment. Further, FIG. 5 shows an example of a conversation held between the voice interaction apparatus 1 according to the first embodiment and a user. Note that in FIG. 5, speeches having odd speech numbers are speeches (voices) output by the voice interaction apparatus 1 and speeches having even speech numbers are speeches (voices) uttered by the user. Further, in the example shown in FIG. 5, it is assumed that the voice interaction apparatus 1 determines whether or not the topic should be continued in the speeches having speech Nos. 6 to 9.

Firstly, the speech acquisition unit 102 acquires user speech as described above (step S102). Then, as described above, the syntactic analysis unit 104 performs a syntactic analysis for the acquired user speech (step S104) and the non-linguistic information analysis unit 106 analyzes non-linguistic information (prosodic information and response history information) for the acquired user speech (step S106). Note that the processes in the steps S104 and S106 may be performed in parallel. Further, the timing at which the process in the step S104 starts may be the same as the timing at which the process in the step S106 starts. Alternatively, the process in the step S106 may start before the process in the step S104 starts. Further, the process in the step S106 is completed before the process in the next step S108 starts. In contrast to this, the process in the step S104 does not necessarily have to be completed even when a later-described process in a step S122 (or a step S132) starts. Further, in this embodiment, the process in the step S104 is not indispensable.

When the process in the step S106 (i.e., the process of analyzing the non-linguistic information) is completed, the topic continuation determination unit 110 determines whether the topic of the current conversation should be continued or should be changed to a different topic by using the non-linguistic information analysis result as described above (step S108). When the topic continuation determination unit 110 determines that the topic should be changed to a different topic (No at step S110), the topic inducement unit 130 generates response voice data indicating a transition question and the voice output unit 150 outputs this generated transition question (step S122). On the other hand, when the topic continuation determination unit 110 determines that the topic should be continued (Yes at step S110), the probing question generation unit 140 generates response voice data indicating a probing question and the voice output unit 150 outputs this generated probing question (step S132).

For example, in the example shown in FIG. 5, the non-linguistic information analysis unit 106 analyzes non-linguistic information for user speech having a speech No. 6, i.e., user speech "Once in a month or so". Further, the topic continuation determination unit 110 determines whether or not the topic should be continued by using the non-linguistic information analysis result for the user speech having the speech No. 6 (S108). Then, the topic continuation determination unit 110 determines that the topic should be changed (No at step S110). Therefore, the topic inducement unit 130 generates a transition question "How is your rehabilitation going?" (speech No. 7) and this transition question is output by the voice output unit 150.

Further, in the example shown in FIG. 5, the non-linguistic information analysis unit 106 analyzes non-linguistic information for user speech having a speech No. 8, i.e., user speech "Not bad". Further, the topic continuation determination unit 110 determines whether or not the topic should be continued by using the non-linguistic information analysis result for the user speech having the speech No. 8 (S108). Then, the topic continuation determination unit 110 determines that the topic should be continued (Yes at step S110). Therefore, the probing question generation unit 140 generates a probing question "Could you tell me more about it?" (speech No. 9) and this probing question is output by the voice output unit 150.

Further, after the processes in the steps S122 and S132, the response history storage unit 152 updates the response history (step S140). Specifically, when a transition question is generated (No at step S110, and step S122), it means that the response type of the voice interaction apparatus 1 is a "question". Therefore, the response history storage unit 152 records the newest response type (the speech No. 7 in the example shown in FIG. 5) as a "question". Further, since the question type is a "transition question", the response history storage unit 152 records the newest question type as a "transition question". Further, the response history storage unit 152 finishes the counting of the time for the topic duration and starts counting a new time.

On the other hand, when a probing question is generated (Yes at step S110, and step S132), it means that the response type of the voice interaction apparatus 1 is a "question". Therefore, the response history storage unit 152 records the newest response type (the speech No. 9 in the example shown in FIG. 5) as a "question". Further, since the question type is a "probing question", the response history storage unit 152 records the newest question type as a "probing question". Further, the response history storage unit 152 continues the counting of the time for the topic duration.

Comparative Example

Next, a comparative example is explained. FIG. 6 shows an example of a conversation held between a voice interaction apparatus according to a related art and a user. Note that in FIG. 6, speeches having odd speech numbers are speeches (voices) output by the voice interaction apparatus 1 and speeches having even speech numbers are speeches (voices) uttered by the user. Note that the voice interaction apparatus according to the related art determines whether a topic should be continued or should be changed by using a syntactic analysis result obtained by analyzing user speech by performing a syntactic analysis.

Note that it is assumed that when the user utters (i.e., speaks) that "Once in a month or so" (speech No. 6), the user actually wants to change the topic. However, the aforementioned user speech does not include any word that prompts the voice interaction apparatus to change the topic. Therefore, the voice interaction apparatus according to the related art cannot change the topic even when it performs the syntactic analysis for the user speech. Then, the user utters "Because I was in the hospital for a long time" (speech No. 10) and this user speech includes words that prompt the voice interaction apparatus to change the topic, i.e., includes the words "in the hospital". Therefore, only when this speech having the speech No. 10 is uttered, the voice interaction apparatus according to the related art can change the topic. As described above, the voice interaction apparatus according to the related art cannot change the topic immediately even when the user wants to change the topic. In the example shown in FIG. 6, a considerable length of time has elapsed after the user uttered "Once in a month or so" (speech No. 6) before the voice interaction apparatus utters (i.e., produces) a question that prompts the user to change the topic, i.e., a question "How is your rehabilitation going?" (speech No. 11). Further, in the voice interaction apparatus according to the related art, there is a possibility that the topic cannot be changed unless the user proactively puts a word(s) that prompts the voice interaction apparatus to change the topic in his/her speech. Therefore, the voice interaction apparatus according to the related art cannot change the topic at an appropriate timing.

Meanwhile, when the user wants to change the topic, there is a strong tendency that, for example, an intention that the user wants to change the topic appears in non-linguistic information such as the rhythm of user speech or the duration of the same topic (i.e., the duration of one topic). Therefore, the voice interaction apparatus 1 according to this embodiment determines whether the topic should be continued or should be changed by using the non-linguistic information analysis result for user speech without using the syntactic analysis result. In this way, as shown in the example shown in FIG. 5, when the user utters "Once in a month or so" (speech No. 6), the voice interaction apparatus 1 can output a transition question for changing the topic (speech No. 7) in the next speech of the voice interaction apparatus itself. That is, in the voice interaction apparatus 1 according to this embodiment, the time between when the user starts wanting to change the topic and when the topic is actually changes is shorter, compared to the case of the comparative example.

Further, when the user wants to continue the topic (speech No. 9), the voice interaction apparatus 1 can output a probing question for continuing the topic in the next speech of the voice interaction apparatus itself. Further, in the voice interaction apparatus 1 according to this embodiment, the topic can be changed even when the user does not proactively put a word(s) that prompts the voice interaction apparatus to change the topic in his/her speech. Further, it is possible to determine whether the topic should be continued or should be changed by using a result of non-linguistic information analysis for user speech that requires a shorter processing time than the time required for syntactic analysis. Therefore, the voice interaction apparatus 1 according to the first embodiment can change a topic at an appropriate timing.

Second Embodiment

Next, a second embodiment is explained. In the second embodiment, the process performed by the topic continuation determination unit 110 is shown below in a more detailed manner than that in the first embodiment. Specifically, the topic continuation determination unit 110 according to the second embodiment determines whether or not a topic should be continued by using a topic duration D1 ($v_{im}$ in FIG. 3) and a fundamental frequency $f0_{500}$ ($v_{i1}$ in FIG. 3) in 500 msec at the phrase end of user speech for which the determination is made (hereinafter referred to as "user speech to be determined") included in the non-linguistic information analysis result. Note that the configuration of the voice interaction apparatus 1 according to the second embodiment is substantially similar to that of the voice interaction apparatus 1 according to the first embodiment shown in FIGS. 1 and 2 and therefore its explanation is omitted.

Figure 7:
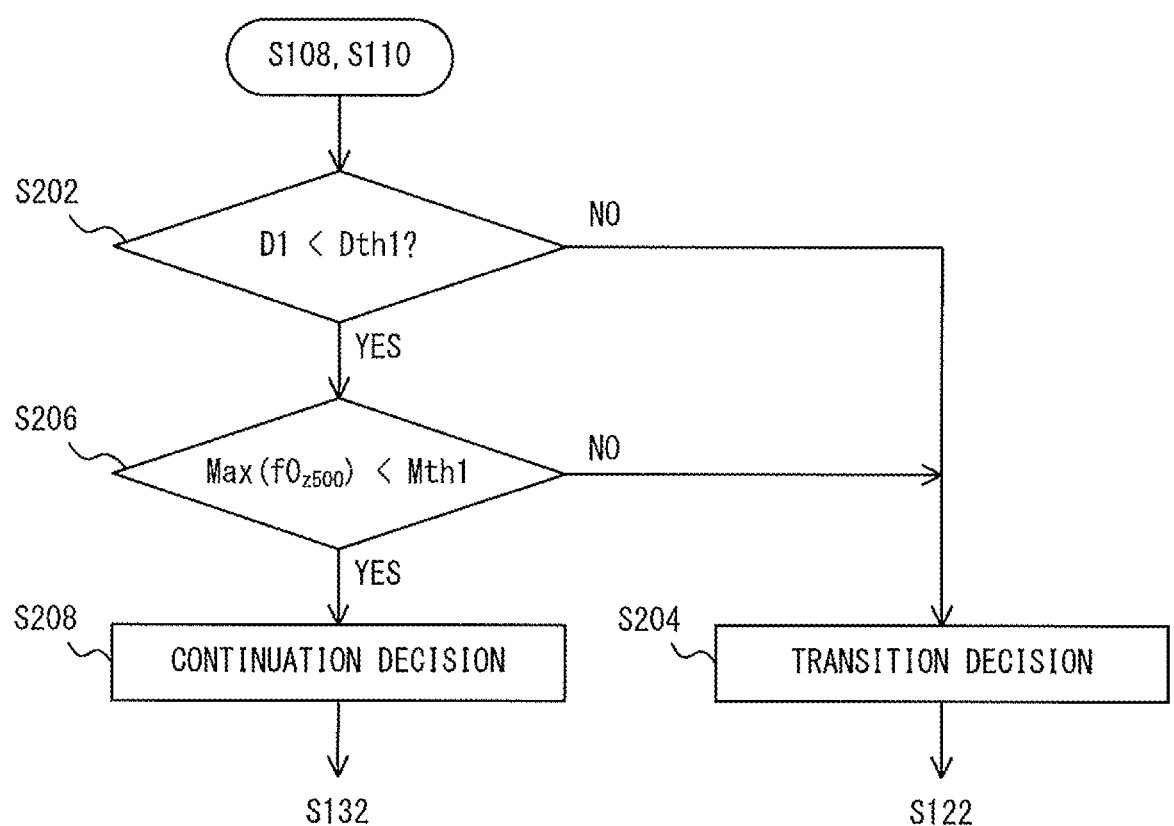
FIG. 7 is a flowchart showing a process performed by a topic continuation determination unit according to a second embodiment.

FIG. 7 is a flowchart showing processes performed by the topic continuation determination unit 110 according to the second embodiment. The flowchart shown in FIG. 7 corresponds to a specific example of the processes in the steps S108 and S110 in the flowchart shown in FIG. 4. The topic continuation determination unit 110 determines whether or not the topic duration D1 is shorter than a predetermined threshold Dth1 (step S202). When the topic duration D1 is equal to or longer than the threshold Dth1 (No at step S202), the topic continuation determination unit 110 determines that the topic should be changed (step S204). Then, the process proceeds to the step S122 in FIG. 4. When the same topic (i.e., one topic) continues for a long time, there is a tendency that the user wants to change the topic to a different topic. By the above-described configuration, it is possible to change the topic without fail.

On the other hand, when the topic duration D1 is shorter than the threshold Dth1 (Yes at step S202), the topic continuation determination unit 110 determines whether or not a maximum value max($f0_{z500}$) of a value $f0_{z500}$ that is obtained by normalizing the fundamental frequency $f0_{500}$ in 500 msec at the phrase end of the user speech is smaller than a predetermined threshold Mth1 (step S206). Specifically, the topic continuation determination unit 110 calculates the maximum value max($f0_{z500}$) from the non-linguistic information analysis result (the feature vector) and compares the calculated maximum value max($f0_{z500}$) with the threshold Mth1. Note that the calculation of the maximum value max($f0_{z500}$) may be performed by the non-linguistic information analysis unit 106.

Note that the normalized value $f0_{z500}$ of the fundamental frequency $f0_{500}$ is calculated by using the below-shown Expression 1. In the expression, $f0^{pre}_{500}$ is a fundamental frequency $f0_{500}$ of the previous speech. The "previous speech" is speech that is uttered by the user before the user speech to be determined (i.e., the user speech for which the determination is made). The "previous" may mean one minute or 10 minutes before the user speech to be determined, or may mean a previous day.

$$f0_{z500}=(f0_{500}-\overline{f0_{500}}^{pre})/\sigma(f0_{500}^{pre}) \quad \text{(Expression 1)}$$

When the maximum value max($f0_{z500}$) is equal to or larger than the threshold Mth1 (No at step S206), the topic continuation determination unit 110 determines that the topic should be changed (step S204). Then, the process proceeds to the step S122 in FIG. 4. On the other hand, when the maximum value max($f0_{z500}$) is smaller than the threshold Mth1 (Yes at step S206), the topic continuation determination unit 110 determines that the topic should be continued (step S208). Then, the process proceeds to the step S132 in FIG. 4. Note that methods for setting the thresholds Dth1 and Mth1 are explained below with reference to FIGS. 8 and 9, respectively.

Figure 8:
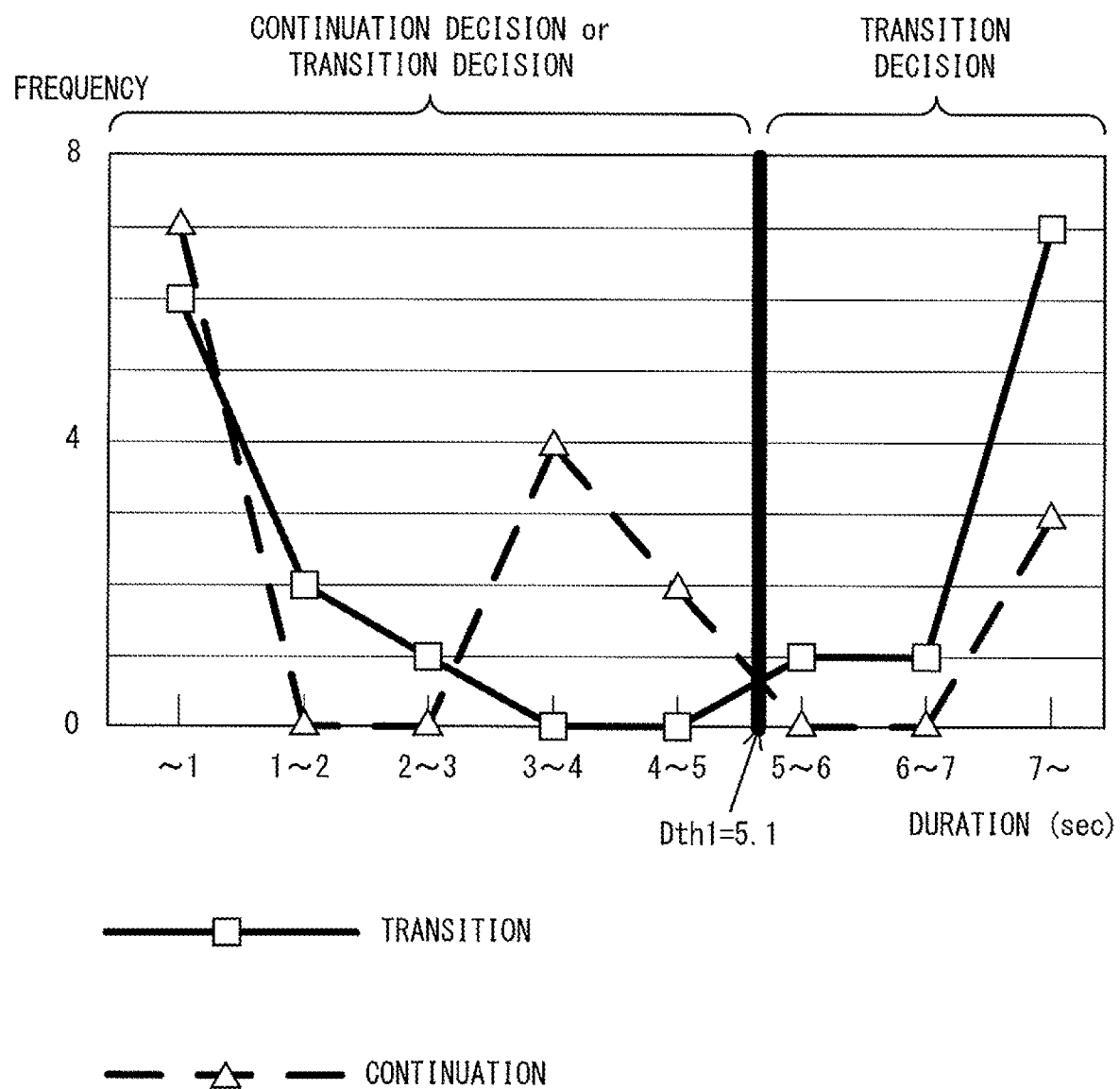
FIG. 8 is a graph showing an example of a relation between durations of topics and frequencies of occurrences of cases where the topic is changed after user speech and occurrences of eases where the topic is continued after user speech.

FIG. 8 is a graph showing an example of a relation between topic durations and frequencies of occurrences of cases where the topic is changed after user speech and occurrences of cases where the topic is continued after user speech. FIG. 8 shows statistical data that is obtained by summarizing data for each of a plurality of user speeches that are extracted in advance as samples. Note that for each of the user speeches, whether the user speech corresponds to a change of the topic or continuation of the topic may be determined by, for example, having a person who makes annotations listen to a conversation (the user speech) (this is also similarly applied to an example shown in FIG. 9).

For example, when the topic duration is shorter than 1 sec, the frequency of occurrences of changes of topics is six. Meanwhile, when the topic duration is shorter than 1 sec, the frequency of occurrences of continuation of topics is seven. Similarly, when the topic duration is equal to or longer than 7 sec, the frequency of occurrences of changes is seven. Meanwhile, when the topic duration is equal to or longer than 7 sec, the frequency of occurrences of continuation of topics is three. As shown above, there is a tendency that when the topic duration is long to some extent, the possibility that the topic is changed is high. On the other hand, when the topic duration is short, there is no tendency as to whether the topic is changed or continued.

As shown in FIG. 8, a boundary value of the topic duration for the tendency that the topic is changed is 5.1 sec. Therefore, the threshold Dth1 is set to 5.1 (Dth1=5.1). Note that the above-described threshold (the boundary value) may be changed as appropriate according to the topic (e.g., a small talk about a travel) provided by the topic inducement unit 130 of the voice interaction apparatus 1. Therefore, the voice interaction apparatus 1 may store a threshold Dth1 for each question stored in the transition question database 132. Further, the above-described threshold may be changed according to the individual language of the speech (Japanese, English, French, etc.). Therefore, the voice interaction apparatus 1 may store a threshold Dth1 for each question stored in the transition question database 132 and for each individual language.

Figure 9:
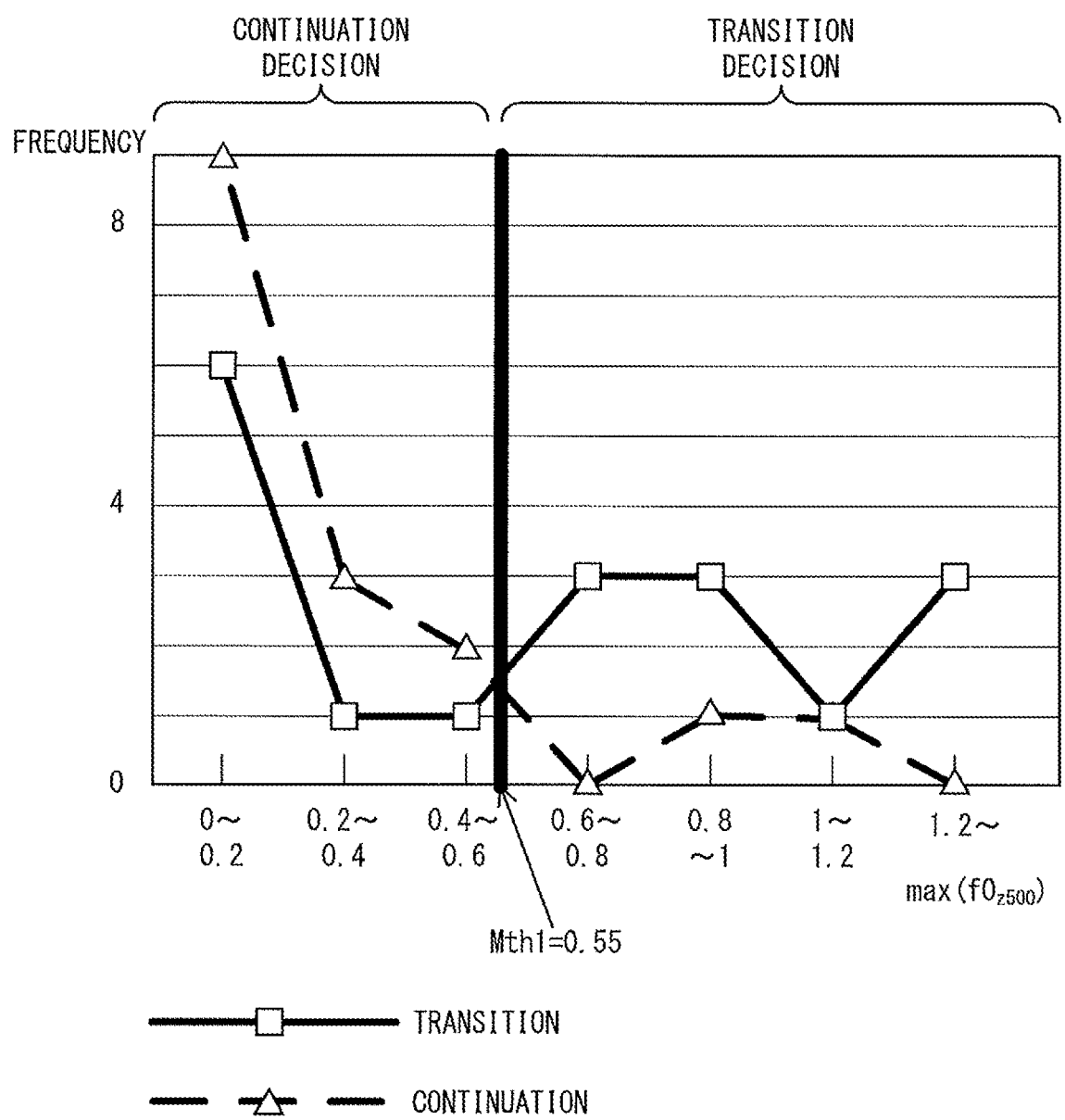
FIG. 9 is a graph showing an example of a relation between maximum values for normalized values of fundamental frequencies in 500 msec at the phrase end of user speech and frequencies of occurrences of cases where the topic is changed after user speech and occurrences of cases where the topic is continued after user speech.

FIG. 9 is a graph showing an example of a relation between maximum values max($f0_{z500}$) for normalized values $f0_{z500}$ of fundamental frequencies $f0_{500}$ in 500 msec at the phrase end of user speech and frequencies of occurrences of cases where the topic is changed after user speech and occurrences of cases where the topic is continued after user speech. FIG. 9 shows statistical data that is obtained by summarizing data for each of a plurality of user speeches that are extracted in advance as samples. For example, when the maximum value max($f0_{z500}$) is smaller than 0.2, the frequency of occurrences of changes of topics is six. Meanwhile, when the maximum value max($f0_{z500}$) is smaller than 0.2, the frequency of occurrences of continuation of topics is nine. As shown above, there is a tendency that when the maximum value max($f0_{z500}$) is small, the possibility that the topic is continued is high.

Similarly, when the maximum value max($f0_{z500}$) is no smaller than 0.6 and smaller than 0.8, the frequency of occurrences of changes of topics is zero. Meanwhile, when the maximum value max($f0_{z500}$) is no smaller than 0.6 and smaller than 0.8, the frequency of occurrences of continuation of topics is three. As shown above, there is a tendency that when the maximum value max($f0_{z500}$) is large, the possibility that the topic is changed is high.

As shown in FIG. 9, the value of the maximum value max($f0_{z500}$) that becomes the boundary value as to whether the topic should be changed or should be continued is 0.55. Therefore, the threshold Mth1 is set to 0.55 (Mth1=0.55). Note that the above-described threshold (the boundary value) may be changed as appropriate according to the topic (e.g., a small talk about a travel) provided by the topic inducement unit 130 of the voice interaction apparatus 1. Therefore, the voice interaction apparatus 1 may store a threshold Mth1 for each question stored in the transition question database 132. Further, the above-described threshold may be changed according to the individual language of the speech (Japanese, English, French, etc.). Therefore, the voice interaction apparatus 1 may store a threshold Mth1 for each question stored in the transition question database 132 and for each individual language.

The voice interaction apparatus 1 according to the second embodiment also determines whether the topic should be continued or should be changed by using the non-linguistic information analysis result for user speech without using the syntactic analysis result. Therefore, similarly to the first embodiment, the voice interaction apparatus 1 according to the second embodiment can change a topic at an appropriate timing.

Further, in the second embodiment, it is possible to determine whether a topic should be continued or should be changed by using predetermined simple determination formulas (corresponding to the processes in the steps S202 and S206). That is, in the second embodiment, the topic continuation determination unit 110 determines whether a topic should be continued or should be changed based on a comparison between feature quantities included in the non-linguistic information analysis result (such as the topic duration D1 and the maximum value of the fundamental frequency f0) and predetermined thresholds corresponding to these feature quantities (such as the thresholds Dth1 and Mth1). Therefore, it is possible to easily determine whether a topic should be continued or should be changed.

Third Embodiment

Next, a third embodiment is explained. In the third embodiment, the process performed by the topic continuation determination unit 110 is shown below in a more detailed manner than that in the first embodiment. Specifically, the topic continuation determination unit 110 according to the third embodiment determines whether a topic should be continued or should be changed by using a determination model (or a decision model) that is generated in advance through machine learning (such as a random forest). More specifically, the topic continuation determination unit 110 distinguishes (i.e., determines) whether a feature (a component of a feature vector) indicated in the non-linguistic information analysis result corresponds to continuation of the topic or a change of the topic (i.e., classifies a feature into a feature corresponding to continuation of the topic or a feature corresponding to a change of the topic) by using a determination model. In this way, the topic continuation determination unit 110 determines whether the topic should be continued or should be changed. Note that the configuration of the voice interaction apparatus 1 according to the third embodiment is substantially similar to that of the voice interaction apparatus 1 according to the first embodiment shown in FIGS. 1 and 2 and therefore its explanation is omitted.

Figure 10:
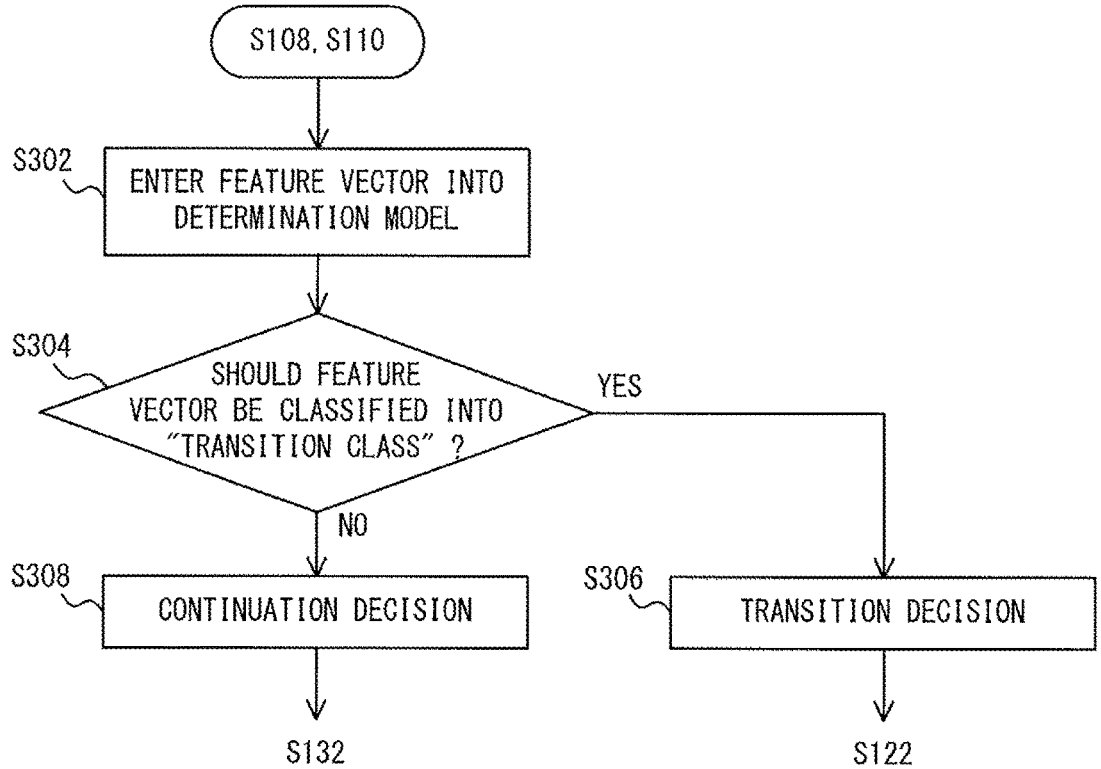
FIG. 10 is a flowchart showing processes performed by a topic continuation determination unit according to a third embodiment.

FIG. 10 is a flowchart showing processes performed by the topic continuation determination unit 110 according to the third embodiment. The flowchart shown in FIG. 10 corresponds to a specific example of the processes in the steps S108 and S110 in the flowchart shown in FIG. 4. The topic continuation determination unit 110 enters a feature vector v of user speech to be determined into a determination model (step S302). Note that as described above, the feature vector v corresponds to a non-linguistic information analysis result. That is, the feature vector v may be generated by the non-linguistic information analysis unit 106. Further, the determination model is formed by decision trees for determining whether a feature vector of corresponding user speech indicates continuation of the topic or a change of the topic. The determination model will be described later.

The topic continuation determination unit 110 determines whether or not the feature vector v is classified into a "transition class" (step S304). Note that the "transition class" is one of classes (categories) into which a feature vector is classified based on the determination model. In this example, the classes into which feature vectors are classified based on the determination model include the "transition class" and a "continuation class". The "transition class" is a class for which a possibility that user speech indicates a transition of a topic is high. Meanwhile, the "continuation class" is a class for which a possibility that user speech indicates continuation of a topic is high (i.e., the possibility that user speech indicates a transition of a topic is low). Details will be described later.

When the feature vector v is classified into the "transition class" (Yes at step S304), the topic continuation determination unit 110 determines that the topic should be changed (step S306). Then, the process proceeds to the step S122 in FIG. 4. On the other hand, when the feature vector v is not classified into the "transition class" (No at step S304), the feature vector v is classified into the "continuation class". Therefore, the topic continuation determination unit 110 determines that the topic should be continued (step S308). Then, the process proceeds to the step S132 in FIG. 4.

Next, a method for generating a determination model is explained. Note that the determination model may be generated by the voice interaction apparatus 1 according to this embodiment or may be generated by an apparatus (a computer) different from the voice interaction apparatus 1.

Figure 11:
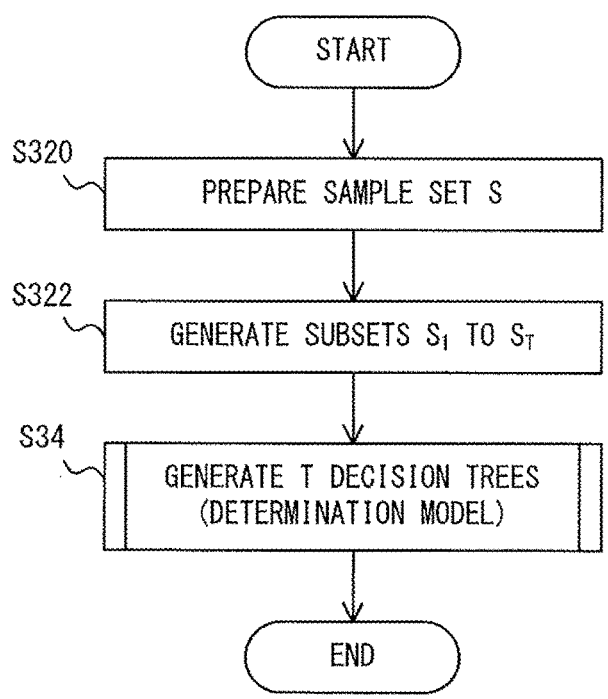
FIG. 11 is a flowchart showing a method for generating a determination model according to the third embodiment.

FIG. 11 is a flowchart showing a method for generating a determination model according to the third embodiment. Firstly, a sample set S is prepared by using a number of leaning data (step S320). Note that samples i, which are elements of the sample set S, are data corresponding to user speech prepared in advance. The number of samples is, for example, about 150. However, the number is not limited to 150. Next, T subsets $S_1$ to $S_T$ are generated by using the sample set S (step S322). The number T of subsets is, for example, about 100. However, the number is not limited to 100. Then, a decision tree (a determination model) is generated for each subset. That is, T decision trees are generated (step S34). Details are explained hereinafter with reference to the drawings.

Figure 12:
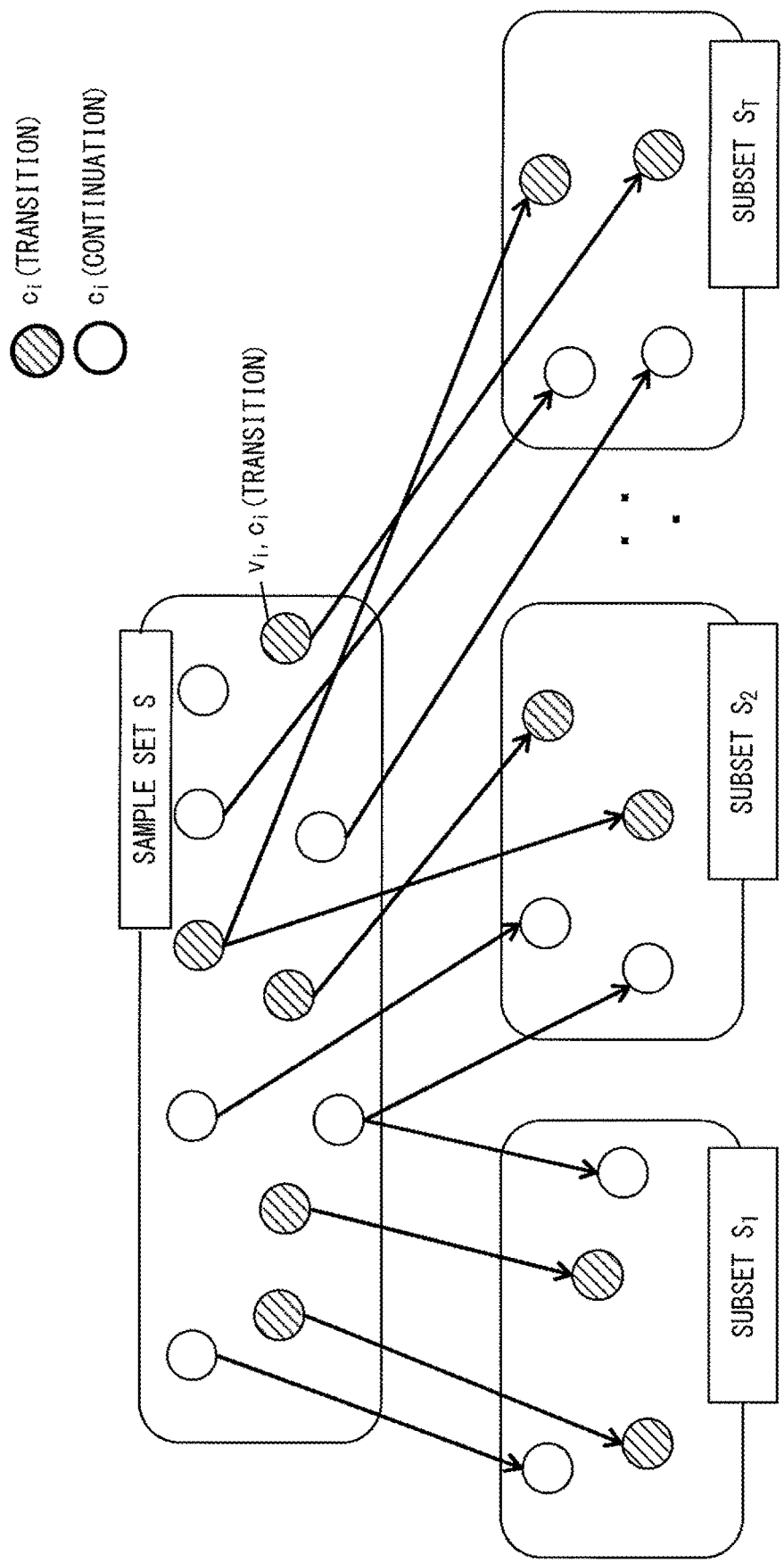
FIG. 12 shows an example of a sample set and subsets.

FIG. 12 shows an example of the sample set S and the subsets $S_1$ to $S_T$. A feature vector vi and a correct label $c_i$ are assigned to each sample i (indicated by a circuit in FIG. 12). The correct label $c_i$ indicates a "transition" when user speech corresponding to its sample i indicates a transition (i.e., a change) and indicates "continuation" when the user speech corresponding to its sample i indicates continuation. Note that in FIG. 12, samples i with "transition" correct labels are indicated by hatching. Further, the "transition class" corresponds to the correct label $c_i$ indicating a "transition" and the "continuation class" corresponds to the correct label $c_i$ indicating "continuation". Note that correct labels $c_i$ are assigned by having a person who makes annotations (hereinafter also referred to as an "annotator") listen to user speeches corresponding to respective samples i. That is, the annotator listens to user speech, determines whether or not the user speech indicates a change of a topic based linguistic information, non-linguistic information, and the like of the user speech, and assigns a correct label $c_i$ to a sample i. For example, the annotator may assign a "transition" correct label to a corresponding sample i when a negative word is included in the user speech. Note that the annotator may assign a correct label $c_i$ to a sample i by observing an image of a user who is uttering the user speech.

Each subset is created by extracting samples i from the sample set S in a random manner and assigning the extracted samples i to that subset. Note that it is assumed that each subset includes the same number of samples i as elements of that subset. The number of samples i in each subset, which are elements of that subset, is, for example, several tens (e.g., 30). Note that for clarifying the explanation, the number i of samples in each subset is four in the example shown in FIG. 12. Further, the same sample i may be included two or more subsets. Further, all the samples i in the sample set S do not necessarily have to be assigned to the subsets.

FIG. 13 shows an example of a feature vector $v_i$ assigned to a sample. Note that the feature vector shown in FIG. 13 is merely an example. That is, other various feature vectors can be used as the feature vector. The feature vector shown in FIG. 13 is a 17-dimensional vector and includes components $x_1$ to $x_{17}$. Note that values of these components $x_1$ to $x_{17}$ are obtained by normalizing feature quantities of respective components (i.e., converting into dimensionless values). The minimum value for these components is zero and the maximum value therefor is one. Note that the dimension 4 ($x_4$) "inclination of f0 in 200 msec at phrase end" corresponds to a variation in a fundamental frequency f0 in 200 msec at the phrase end. Specifically, "inclination of f0 in 200 msec at phrase end" may correspond to a value that is obtained by subtracting an average value of the fundamental frequency ID in 100 msec in the first half of 200 msec at the phrase end from an average value of the fundamental frequency f0 in 100 msec in the second half of 200 msec at the phrase end.

Figure 14:
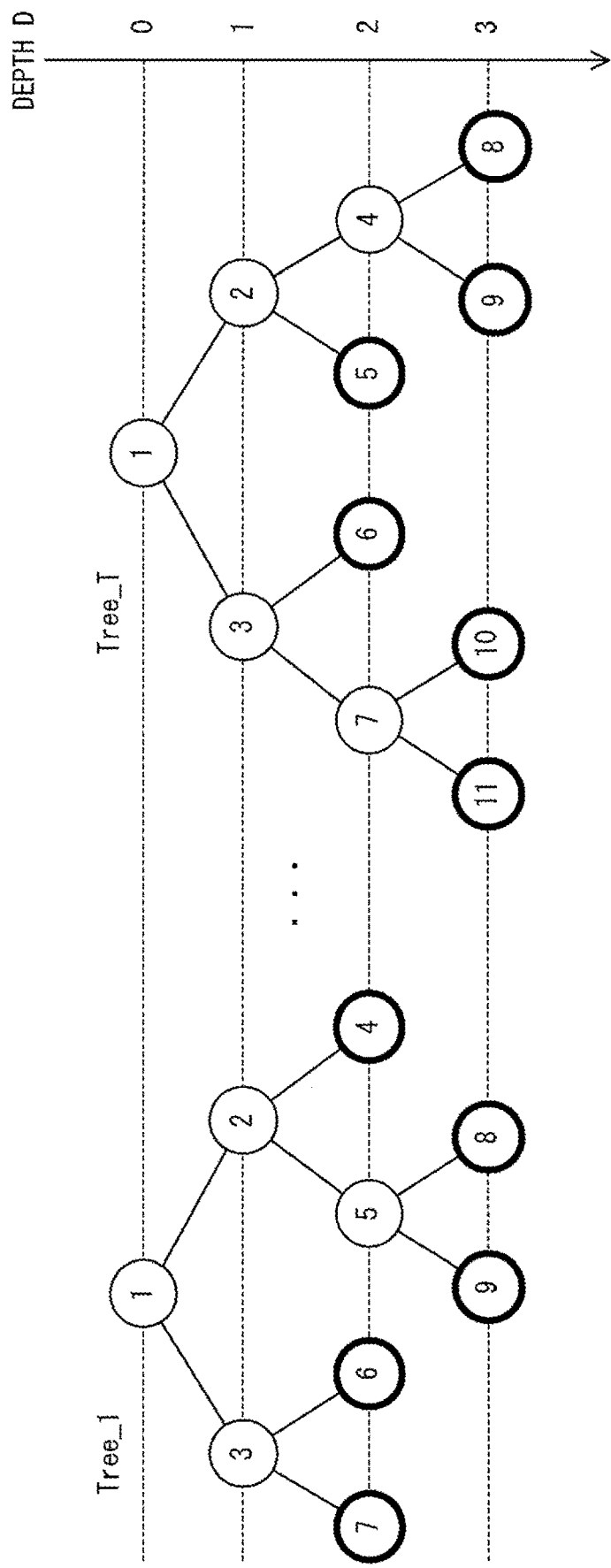
FIG. 14 shows an example of decision trees (a determination model) generated by a process in a step S34 in FIG. 11.

FIG. 14 shows an example of decision trees (a determination model) generated by a process in a step S34 in FIG. 11. In the example shown in FIG. 14, T decision trees Tree_1 to Tree_T are generated. If the depth D of a decision tree is made too deep, there is a risk of overlearning. Therefore, the depth D of decision trees shown in FIG. 14 is three at the maximum. For example, in the Tree_1, nodes 2 and 3 are in a depth 1 and nodes 4 to 7 are in a depth 2. Further, nodes 8 and 9 are a depth 3.

Further, for example, in the Tree_1, a node 1 is a root node and nodes 2 and 3, which are child nodes of the node 1, are branched from the node 1. Further, nodes 4 and 5, which are child nodes of the node 2, are branched from the node 2, and nodes 6 and 7, which are child nodes of the node 3, are branched from the node 3. Further, nodes 8 and 9, which are child nodes of the node 5, are branched from the node 5. Further, the nodes 4, 6, 7, 8 and 9 are terminal nodes (indicated by bold-line circles). When a feature vector of user speech to be determined is entered into the node 1, which is the root node, it eventually reaches one of the nodes 4, 6, 7, 8 and 9, which are the terminal nodes. Note that nodes 1, 2, 3 and 5 other than the terminal nodes are branch nodes (indicated by narrow-line circles).

Note that for each branch node, a branch function F for defining (i.e., determining) which of child nodes a feature vector should be branched is assigned. Further, for each terminal node, a possibility P that a feature vector that has reached that terminal node corresponds to a "transition class" (or a "continuation class") is associated (i.e., assigned). A method for generating decision trees is explained hereinafter.

Figure 15:
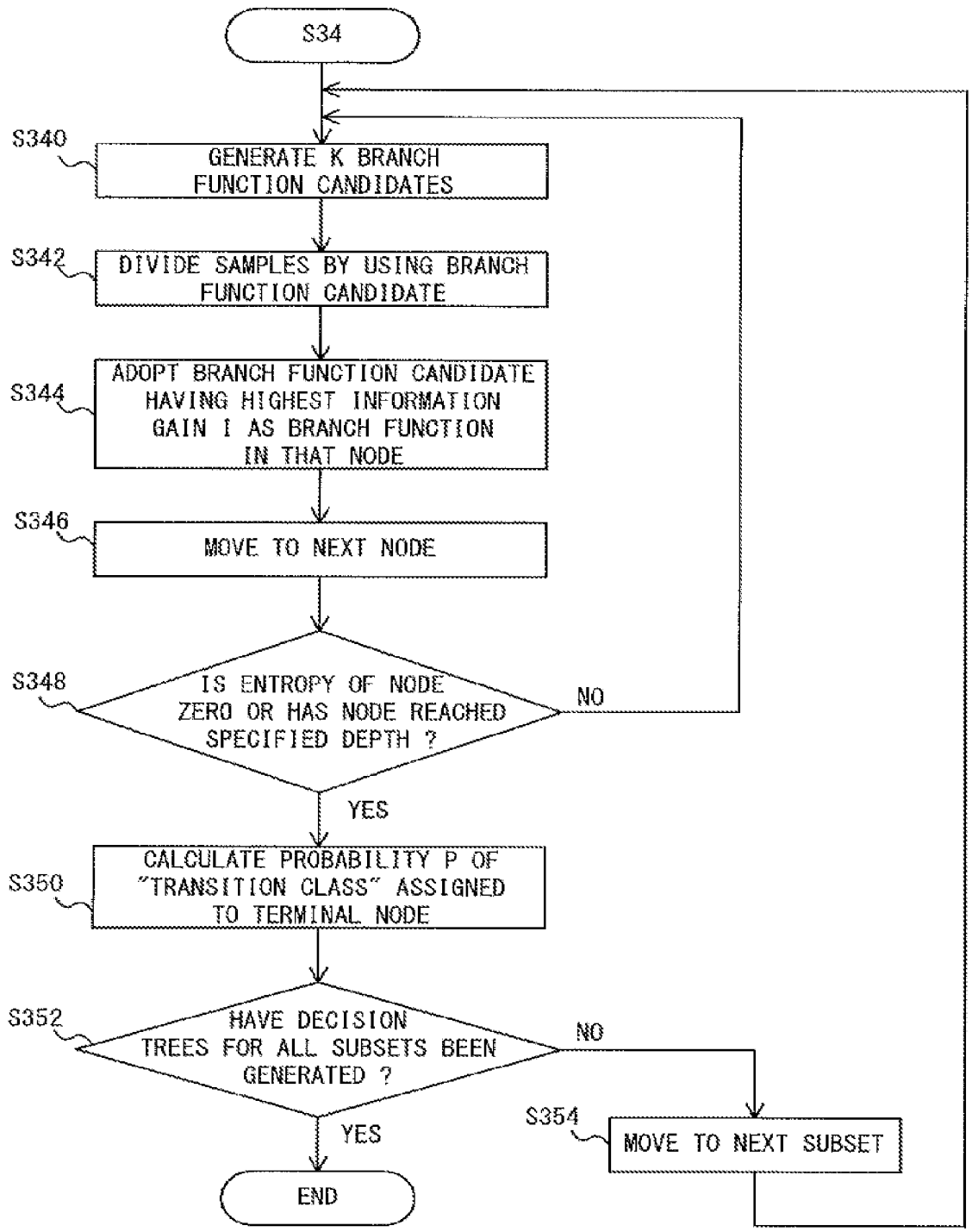
FIG. 15 is a flowchart showing a method for generating decision trees.

FIG. 15 is a flowchart showing a method for generating decision trees. Firstly, for a given branch node (e.g., a node 1, which is a root node) of a given subset (e.g., a subset $S_1$), K branch function candidates Fc ($Fc_k$; k=1 to K) are generated in a random manner (step S340). Each branch function candidate Fc is a function including at least one of the components ($x_1$ to $x_{17}$) of the feature vector shown in FIG. 13 as a parameter. Note that for each branch function candidate $Fc_k$, a threshold $t_k$ that becomes a boundary as to which of child nodes a feature vector is branched is associated (i.e., assigned). Note that the threshold $t_k$ may also be generated in a random manner. Note that the value of K may be a value equal to or close to the square root of the number of dimensions of the feature vector. Therefore, in the example shown in FIG. 13, since the number of dimensions of the feature vector is 17, the number K is four (K=4).

For example, the branch function candidate Fc1 may be a function of $x_1$ and its corresponding threshold $t_1$ may be 0.4. Further, the branch function candidate $Fc_2$ may be a function of $x_3$ and its corresponding threshold $t_2$ may be 0.3. Further, the branch function candidate $Fc_3$ may be a function of $x_5$ and its corresponding threshold $t_3$ may be 0.6. Further, the branch function candidate $Fc_4$ may be a function of $x_{17}$ and its corresponding threshold $t_4$ may be 0.4.

Next, samples i are divided by using respective branch function candidates Fc (step S342). Specifically, by using the below-shown Expression 2, samples i of a sample set $S_j$ of the node before the branching (i.e., the parent node) are divided into a sample set $S_L$ at a child node on the left side or a sample set $S_R$ at a child node on the right side.

$$S_L = \{i \in S_j | Fc_k(v_i) < t_k\}$$

$$S_R = S_j \backslash S_L, \text{ where "\textbackslash" is division operator} \quad \text{(Expression 2)}$$

Next, a branch function candidate Fc having the highest information gain I is adopted as a branch function F in that node (step S344). Specifically, firstly, information gain I expressed by the below-shown Expression 3 is calculated for each branch function candidate Fc.

$$I = H(S_j) - \frac{|S_L|}{|S_j|} H(S_L) - \frac{|S_R|}{|S_j|} H(S_R) \quad \text{(Expression 3)}$$

In the expression, H(S) is entropy of a set S defined by the below-shown Expression 4. Note that C is the number of classes. In the above-described example, the number C is two (C=2). Further, it is assumed that "c=1" corresponds to a "transition class" and "c=2" corresponds to a "continuation class". Further, in the below-shown expression, $P_c$ is an appearance probability of a class c in the set S. Further, the entropy H(S) indicates a bias of an appearance probability of each class in the set S. When the bias of an appearance probability of each class is small, the entropy increases.

$$H(S) = -\Sigma_{c=1}^{C} P_c \log_2 P_c \quad \text{(Expression 4)}$$

Figure 16:
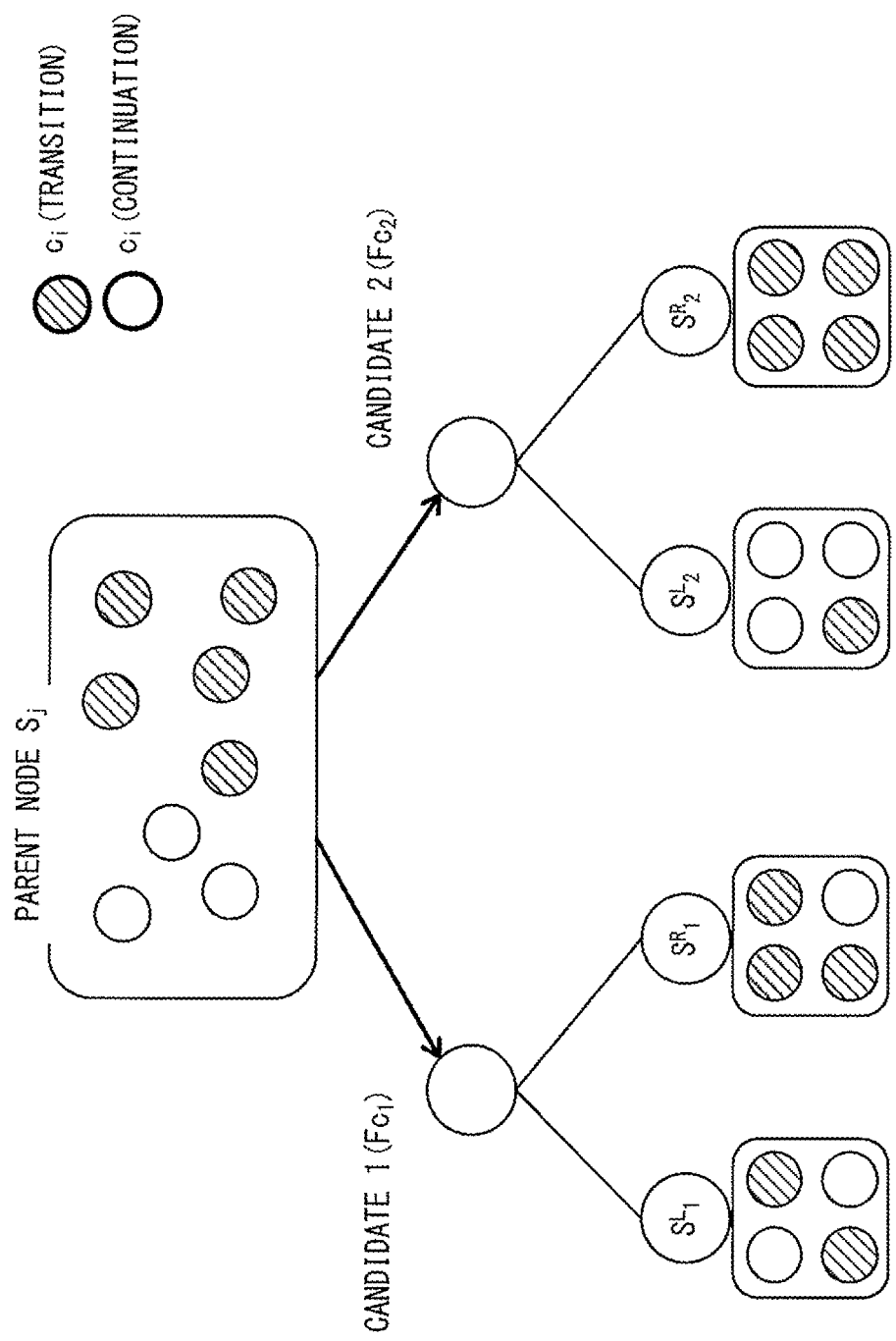
FIG. 16 shows an example of a set that is divided into two subsets for two respective branch function candidates.

FIG. 16 shows an example of a set that is divided into two subsets for two respective branch function candidates Fc. In the example explained below, for clarifying the explanation, it is assumed that the number of branch function candidates Fc is two. Samples of a set $S_j$ at the parent node are divided into a set $S^L_1$ and a set $S^R_1$ by a branch function candidate $Fc_1$ (a candidate 1). Further, the samples of the set $S_j$ at the parent node are divided into a set $S^L_2$ and a set $S^R_2$ by a branch function candidate $Fc_2$ (a candidate 2). In the example shown in FIG. 16, eight samples of the set $S_j$ at the parent node are divided into subsets each of which includes four samples by respective branch function candidates Fc.

In this case, the entropy $H(S_j)$ of the set $S_j$ at the parent node is calculated as shown by the below-shown Expression 5 by using the above-shown Expression 4.

$$H(S_j) = -\frac{5}{8}\log_2\frac{5}{8} - \frac{3}{8}\log_2\frac{3}{8} = 0.954 \quad \text{(Expression 5)}$$

Further, the entropies of the divided sets $S^L_1$ and $S^R_1$ for the candidate 1 are calculated as shown by the below-shown Expression 6 by using the above-shown Expression 4.

$$H(S^L_1) = -\frac{2}{4}\log_2\frac{2}{4} - \frac{2}{4}\log_2\frac{2}{4} = 1 \quad \text{(Expression 6)}$$

$$H(S^R_1) = -\frac{3}{4}\log_2\frac{3}{4} - \frac{1}{4}\log_2\frac{1}{4} = 0.811$$

Further, the entropies of the divided sets $S^L_2$ and $S^R_2$ for the candidate 2 are calculated as shown by the below-shown Expression 7 by using the above-shown Expression 4.

$$H(S^L_2) = -\frac{1}{4}\log_2\frac{1}{4} - \frac{3}{4}\log_2\frac{3}{4} = 0.811 \quad \text{(Expression 7)}$$

$$H(S^R_2) = -\frac{4}{4}\log_2\frac{4}{4} - \frac{0}{4}\log_2\frac{0}{4} = 0$$

Therefore, the information gains $I_1$ and $I_2$ of the candidates 1 and 2, respectively, are calculated as shown by the below-shown Expression 8 by using the above-shown Expression 3.

$$I_1 = 0.954 - \frac{4}{8}H(S^L_1) - \frac{4}{8}H(S^R_1) = 0.0485 \quad \text{(Expression 8)}$$

-continued
$$I_2 = 0.954 - \frac{4}{8}H(S_2^L) - \frac{4}{8}H(S_2^R) = 0.549$$

Since the information gain $I_1$ is smaller than the information gain $I_2$ ($I_1<I_2$) based on Expression 8, the branch function candidate $Fc_2$ is adopted as the branch function F of the parent node. Further, nodes corresponding to the sets $S^L_2$ and $S^R_2$ are defined as child nodes for the aforementioned parent node. That is, in the case where the parent node is the node 1, i.e., the root node, the node corresponding to the set $S^R_2$ becomes the node 2. The node corresponding to the set $S^L_2$ becomes the node 3.

Next, the process moves to the next node (step S346). Note that when there is a child node as in the case of the above-described node, the process moves to the child node. On the other hand, when there is no child node, the process moves to another node for which the process has not been finished yet. Then, it is determined whether or not the entropy of the node to be processed is zero or whether or not the node has reached the specified depth (step S348). When the entropy of the node to be processed is zero or when the node has reached the specified depth (Yes at step S348), that node is determined to be a terminal node. Then, an appearance probability P for a "transition class" that is assigned to the terminal node is calculated (step S350). On the other hand, when the entropy of the node to be processed is not zero and the node has not reached the specified depth yet (No at step S348), that node is determined to be a branch node. Therefore, for this node, the processes in the steps S340 to S344 are repeated.

Specifically, in the example shown in FIG. 16, the entropy of the set $S^R_2$ is zero. Therefore, the node corresponding to this set $S^R_2$ is determined to be a terminal node. Then, an appearance probability P (P=1) for a "transition class" that is assigned to this node is calculated. Note that when entropy is zero, the appearance probability P for a "transition class" for that terminal node is one or zero.

Further, in the example shown in FIG. 16, the entropy of the set $S^L_2$ is not zero. Therefore, when the depth of the node corresponding to this set $S^L_2$ has not reached the predetermined depth (the depth 3 in the example shown in FIG. 14), this node is determined as a branch node and the processes in the steps S340 to S344 are repeated. On the other hand, when the depth of the node corresponding to this set $S^L_2$ has reached the predetermined depth, this node is determined as a terminal node. Then, an appearance probability P (P=1/4) for a "transition class" that is assigned to this node is calculated.

Next, it is determined whether or not decision trees are generated for all the subsets (step S352). When decision trees have not been generated for all the subsets (No at step S352), the process moves to the next subset for which a decision tree has not been generated yet (step S354) and the processes in the steps S340 to S350 are repeated. On the other hand, when decision trees have been generated for all the subsets (Yes at step S352), it means that the determination model has been completed and hence the process is finished. Note that the generation of a plurality of decision trees may be performed in parallel. That is, the generation of the decision trees Tree_1 to Tree_T can be simultaneously performed.

Next, a method for classifying feature vectors using a determination model is explained.

FIG. 17 is a diagram for explaining a method for classifying feature vectors by using the decision trees (the determination model) shown in FIG. 14 (i.e., the step S304 in FIG. 10). Firstly, a feature vector v is entered into the decision tree Tree_1. When the feature vector v is substituted into a branch function $F^1_1$ (a threshold $t^1_1$) at the node 1, the feature vector moves to a child node 2 on the right side according to Expression 2 because the function $F^1_1(v)$ is equal to or larger than the threshold $t^1_1$ ($F^1_1(v) \geq t^1_1$). When the feature vector v is substituted into a branch function $F^1_2$ (a threshold $t^1_2$) at the node 2, the feature vector moves to a child node 5 on the left side according to Expression 2 because the function $F^1_2(v)$ is smaller than the threshold $t^1_2$ ($F^1_2(v)<t^1_2$). When the feature vector v is substituted into a branch function $F^1_5$ (a threshold $t^1_5$) at the node 5, the feature vector moves to a child node 9 on the left side according to Expression 2 because the function $F^1_5(v)$ is smaller than the threshold $t^1_5$ ($F^1_5(v)<t^1_5$). Further, since the node 9 is a terminal node, the probability that the feature vector v is classified into each class (i.e., into a transition class or a continuation class) for the decision tree Tree_1 is a probability $P_1(c|v)$ associated with (i.e., assigned to) the node 9. In the example shown in FIG. 17, the probability that the feature vector v is classified into a transition class is 0.6 (i.e., $P_1(c=1|v)=0.6$) and the probability that the feature vector v is classified into a continuation class is 0.4 (i.e., $P_1(c=2|v)-0.4$).

Further, when the feature vector v is entered into the decision tree Tree_T and the feature vector v is substituted into a branch function $F^T_1$ (a threshold $t^T_1$) at the node 1, the feature vector moves to a child node 3 on the left side according to Expression 2 because the function $F^T_1(v)$ is smaller than the threshold $t^T_1$ ($F^T_1(v)<t^T_1$). When the feature vector v is substituted into a branch function $F^T_3$ (a threshold $t^T_3$) at the node 3, the feature vector moves to a child node 7 on the left side according to Expression 2 because the function $F^T_3(v)$ is smaller than the threshold $t^T_3$ ($F^T_3(v)<t^T_3$). When the feature vector v is substituted into a branch function $F^T_7$ (a threshold $t^T_7$) at the node 7, the feature vector moves to a child node 10 on the right side according to Expression 2 because the function $F^T_7(v)$ is equal to or larger than the threshold $t^T_7$ ($F^T_7(v) \geq t^T_7$). Further, since the node 10 is a terminal node, the probability that the feature vector v is classified into each class (i.e., into a transition class or a continuation class) for the decision tree Tree_T, is a probability $P_T(c|v)$ associated with (i.e., assigned to) the node 10. In the example shown in FIG. 17, the probability that the feature vector v is classified into a transition class is 0.8 (i.e., $P_T(c=1|v)=0.8$) and the probability that the feature vector v is classified into a continuation class is 0.2 (i.e., $P_T(c=2|v)=0.2$). In this way, the topic continuation determination unit 110 performs the above-described process for the decision trees Tree_1 to Tree_T.

The topic continuation determination unit 110 calculates a unified probability $P(c|v)$ by using the probabilities $P_1(c|v)$ to $P_T(c|v)$ calculated in the respective decision trees by using the below-shown Expression 9.

$$P(c \mid v) = \frac{1}{T}\sum_{t=1}^{T} P_t(c \mid v) \qquad \text{(Expression 9)}$$

Then, the topic continuation determination unit 110 determines that the feature vector v is classified into a class corresponding to a class c for which the probability $P(c|v)$ has a maximum value. For example, when the probability $P(c=1|v)$ is 0.7 (i.e., $P(c=1|v)=0.7$) and the probability P(c=2|v) is 0.3 (i.e., P(c=2|v)=0.3), the topic continuation determination unit 110 determines that the feature vector is classified into a class corresponding to "c=1", i.e., into the transition class.

The voice interaction apparatus 1 according to the third embodiment also determines whether the topic should be continued or should be changed by using the non-linguistic information analysis result for user speech without using the syntactic analysis result. Therefore, similarly to the first embodiment, the voice interaction apparatus 1 according to the third embodiment can change a topic at an appropriate timing.

Further, in the third embodiment, it is possible to determine whether a topic should be continued or should be changed by using a determination model that is generated in advance through machine learning. Note that by using the determination model generated through machine learning, it is possible to perform more accurate discrimination (i.e., more accurate determination). Therefore, the determination whether a topic should be continued or should be changed can be made more accurately than that in the second embodiment.

Note that in the third embodiment, it is necessary to prepare a determination model in advance. Therefore, the above-described process according to the second embodiment can be carried out more easily than that according to the third embodiment.

Modified Examples

Note that the present disclosure is not limited to the above-described embodiments, and various modifications can be made without departing from the spirit and scope of the present disclosure. For example, the order of a plurality of processes in the above-described flowcharts can be changed as appropriate. Further, at least one of the plurality of processes in the above-described flowcharts may be omitted. Further, the determination whether a topic should be continued or should be changed does not necessarily have to be made at all times.

Further, in the above-described embodiments, it is determined whether a topic should be continued or should be changed by performing a non-linguistic information analysis for user speech. However, it is possible to use other methods in addition to the non-linguistic information analysis for user speech. For example, an image recognition process may be performed for a camera image obtained by photographing a user by a camera installed in the voice interaction apparatus 1 and a result of this image recognition process (e.g., a facial expression or the like of the user) may be used. In this way, it is possible to perform the determination whether a topic should be continued or should be changed more accurately than that in the case where only the non-linguistic information analysis result is used.

Further, some of the processes performed by the non-linguistic information analysis unit 106 may be performed in the syntactic analysis unit 104. That is, the syntactic analysis unit 104 may perform some of the processes performed in the non-linguistic information analysis unit 106 when it is necessary to perform a syntactic analysis. Therefore, the syntactic analysis unit 104 may perform a syntactic analysis by using an analysis result of the non-linguistic information analysis unit 106.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A voice interaction apparatus configured to have a conversation with a user by using a voice, comprising:
   a processor configured to:
   determine a first relation between normalized values of fundamental frequencies at phrase endings in user speech acquired in advance and frequencies of occurrences of cases where a topic is changed, and a second relation between the normalized values of the fundamental frequencies at the phrase endings in the user speech acquired in advance and frequencies of occurrences of cases where the topic is continued;
   acquire user speech given by the user;
   acquire frequency information by analyzing prosodic information on the user speech given by the user;
   determine whether or not a current topic of a current conversation should be continued according to a result of comparing the acquired frequency information with at least one of: the first relation or the second relation;
   generate a response according to a result of the determination of whether or not the current topic of the current conversation should be continued; and
   cause a voice corresponding to the generated response to be output.

2. The voice interaction apparatus according to claim 1, wherein the processor is further configured to determine whether or not the current topic of the current conversation should be continued based on a comparison between at least one feature quantity included in a prosodic information analysis result and a predetermined threshold corresponding to the at least one feature quantity.

3. The voice interaction apparatus according to claim 2, wherein the processor is further configured to determine that the current topic of the current conversation should be changed when a duration of the same topic is equal to or longer than a predetermined threshold.

4. The voice interaction apparatus according to claim 1, wherein the processor is further configured to determine whether or not the current topic of the current conversation should be continued by determining whether a feature indicated by a prosodic information analysis result corresponds to continuation of the current topic or corresponds to a change of the current topic by using a determination model generated in advance through machine learning.

5. The voice interaction apparatus according to claim 1, wherein the analyzing the prosodic information on the user speech given by the user includes analyzing history information.

6. The voice interaction apparatus according to claim 1, wherein the processor is further configured to:
analyze the prosodic information based on a voice waveform by performing a voice analysis for the acquired user speech; and
calculate a value indicating a feature quantity indicating the prosodic information.

7. The voice interaction apparatus according to claim 6, wherein the processor is further configured to calculate, for the acquired user speech, a fundamental frequency for each of frames that are obtained by dividing the acquired user speech at predetermined time intervals.

8. The voice interaction apparatus according to claim 1, wherein the at least one feature quantity includes one of: an average of frequency in a predetermined time period before phrase end, a standard deviation of frequency in the predetermined time period before phrase end, a maximum value of frequency in the predetermined time period before phrase end, or an inclination of frequency in the predetermined time period before phrase end.

9. The voice interaction apparatus according to claim 1, wherein the normalized values are normalized maximum values.

10. A voice interaction method performed by using a voice interaction apparatus configured to have a conversation with a user by using a voice, the voice interaction method comprising:
determining a first relation between normalized values of fundamental frequencies at phrase endings in user speech acquired in advance and frequencies of occurrences of cases where a topic is changed, and a second relation between the normalized values of the fundamental frequencies at the phrase endings in the user speech acquired in advance and frequencies of occurrences of cases where the topic is continued;
acquiring user speech given by the user;
acquiring frequency information by analyzing prosodic information on the user speech given by the user;
determining whether or not a current topic of a current conversation should be continued according to a result of comparing the acquired frequency information with at least one of: the first relation or the second relation;
generating a response according to a result of the determination of whether or not the current topic of the current conversation should be continued; and
outputting a voice corresponding to the generated response.

* * * * *